United States Patent
Ma et al.

(10) Patent No.: US 12,512,090 B2
(45) Date of Patent: Dec. 30, 2025

(54) METHOD EXECUTED BY ELECTRONIC DEVICE, ELECTRONIC DEVICE AND STORAGE MEDIUM

(71) Applicant: SAMSUNG ELECTRONICS CO., LTD., Suwon-si (KR)

(72) Inventors: Qiuyue Ma, Beijing (CN); Yuxing Zheng, Beijing (CN); Hosang Sung, Suwon-si (KR); Lizhong Wang, Beijing (CN); Xiaoyan Lou, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 237 days.

(21) Appl. No.: 18/223,265

(22) Filed: Jul. 18, 2023

(65) Prior Publication Data

US 2024/0038215 A1 Feb. 1, 2024

(30) Foreign Application Priority Data

Jul. 29, 2022 (CN) .......................... 202210910556.9
Nov. 28, 2022 (CN) .......................... 202211505179.7

(51) Int. Cl.
 *G10L 15/02* (2006.01)
 *G10L 15/10* (2006.01)

(52) U.S. Cl.
 CPC .............. *G10L 15/02* (2013.01); *G10L 15/10* (2013.01)

(58) Field of Classification Search
 USPC ................ 704/231, 246, 247, 251, 252, 275
 See application file for complete search history.

(56) References Cited

U.S. PATENT DOCUMENTS

| | | | |
|---|---|---|---|
| 2016/0206955 A1* | 7/2016 | Goslin | G06F 3/0346 |
| 2017/0177298 A1* | 6/2017 | Hardee | G06F 3/0482 |
| 2020/0184996 A1 | 6/2020 | Steele et al. | |
| 2020/0356340 A1* | 11/2020 | Hanes | G06F 3/167 |
| 2020/0380955 A1 | 12/2020 | Lesso | |
| 2022/0020362 A1* | 1/2022 | Kang | G06N 3/044 |
| 2022/0230659 A1 | 7/2022 | Khaleghimeybodi et al. | |
| 2022/0246129 A1 | 8/2022 | Sung et al. | |
| 2022/0323290 A1* | 10/2022 | Sloan | A61H 19/00 |

(Continued)

FOREIGN PATENT DOCUMENTS

| | | |
|---|---|---|
| CN | 110769354 A | 2/2020 |
| CN | 110931020 A | 3/2020 |

(Continued)

*Primary Examiner* — Leonard Saint-Cyr
(74) *Attorney, Agent, or Firm* — Sughrue Mion, PLLC

(57) ABSTRACT

The present disclosure provides methods, devices, and computer-readable mediums for audio signal processing. In some embodiments, a method executed by an electronic device includes obtaining guidance features corresponding to an audio signal to be processed, the guidance features indicating distinguishable features of at least one signal type of at least one signal category. The method further includes extracting, according to the guidance features, target audio features corresponding to the audio signal. The method further includes determining, according to the target audio features, a target signal type of the audio signal from among the at least one signal type of the at least one signal category. The method further includes performing corresponding processing according to the target signal type of the audio signal.

20 Claims, 25 Drawing Sheets

(56) References Cited

U.S. PATENT DOCUMENTS

2023/0178069 A1* 6/2023 Vaughan ............... G10L 13/047
704/260
2023/0390147 A1* 12/2023 Sloan ..................... G10L 25/93

FOREIGN PATENT DOCUMENTS

| | | |
|---|---|---|
| CN | 108766468 B | 11/2021 |
| JP | 2011-75989 A | 4/2011 |
| JP | 2021-18272 A | 2/2021 |

* cited by examiner

FIG. 2

| No. | Category | Type |
|---|---|---|
| 1 | Non-voice | Coughing |
| 2 | | hacking coughing |
| 3 | | severe coughing |
| 4 | | hawking |
| 5 | | sighing |
| 6 | | yawning |
| 7 | | laughing |
| 8 | | eating snacks |
| 9 | | nail scraping |
| 10 | | touching |
| 11 | | clicking teeth |
| 12 | | brushing teeth |
| 13 | | electric toothbrush |
| 14 | | fan |
| 15 | | massage chair |
| 16 | | snuffling |
| 17 | | drinking through a straw |
| 18 | | sneezing |
| 19 | | removing the mask from the left side |
| 20 | | removing the mask from the right side |
| 21 | | backseat sound |
| 22 | | wind noise |
| 23 | | humming |
| 24 | | common voice |
| 25 | Voice | speak in a low voice |
| 26 | | speak in a loud voice |
| 27 | | speak quickly |

FIG. 10

| Accuracy in distinguishing from voice signals | Vibration | Cough-like | Hum-like |
|---|---|---|---|
| Feature A: bone-conducted signal | 94% | 97% | 91% |
| Feature B: enhanced low-frequency | 93% | 99% | 92% |
| Feature C: enhanced full-frequency-domain | 91% | 94% | 94% |

FIG. 15

| A is a typical non-voice signal category, with unvoiced sounds in the spectral features, no harmonic vibration, with uniform energy distribution, just like white noise, which may be easy to distinguish from the spectrum region of voices. | B is a typical voice signal category, the vocal cords vibrate when a person speaks, producing significant harmonics in the frequency domain due to periodicity, which are fringes in the spectrum and may be observed in the bone-conducted signal, with great difference from sample A. | C gathers all audio samples with smooth horizontal fringe harmonics in the spectrum, including non-voice signals, for example, sound produced by the electric toothbrush, and voice signals, for example the voice "Ah". | D includes all samples with harmonics and unvoiced sounds mixed, with harmonics and features just like white noises in the spectrum, including non-voice signals, for example, loud cough sound, and also voice signals, for example, voice produced when a person speaks in the wind noise. |
|---|---|---|---|
| 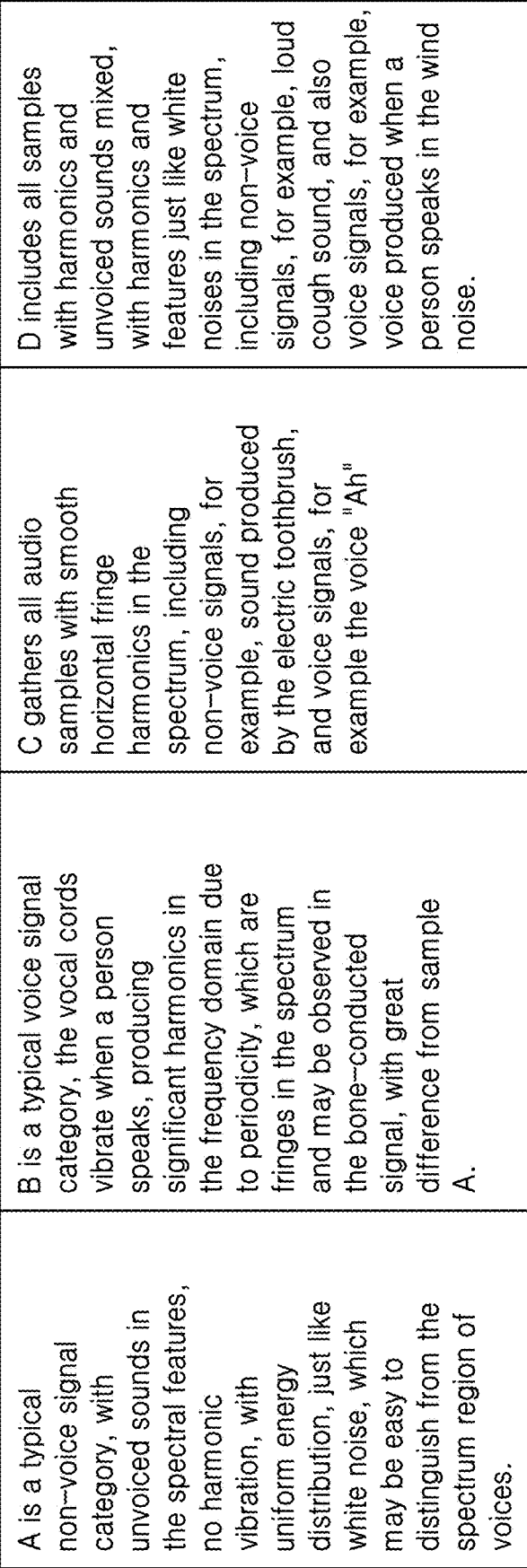 | 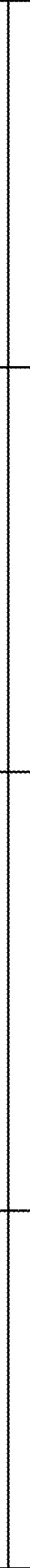 | C1 non-voice   C2 voice <br>     <br> Electric toothbrus   "Ah" | D1 non-voice   D2 voice <br>     <br> cough   Speaks in the wind |

FIG. 16

| C gathers all audio samples with smooth horizontal fringe harmonics in the spectrum, including non-voice signals, for example, sound produced by the electric toothbrush, and voice signals, for example the voice "Ah" | D includes all samples with harmonics and unvoiced sounds mixed, with harmonics and features just like white noises in the spectrum, including non-voice signals, for example, loud cough sound, and also voice signals, for example, voice produced when a person speaks in the wind noise. |
|---|---|
| Guidance vector:<br>Focus on "the trajectory of the first formant" in the spectrum | Guidance vector:<br>Focus on "the short arc-shaped peak in the harmonics in the upper part" in the spectrum |
| Electric toothbrush — Keep smooth in the timeline<br>"Ah" — Slight fluctuations in the timeline | Cough — There is a short arc-shaped harmonic<br>Speak in the wind — There is no short arc in the harmonics in the upper part |

METHOD EXECUTED BY ELECTRONIC DEVICE, ELECTRONIC DEVICE AND STORAGE MEDIUM

CROSS-REFERENCE TO RELATED APPLICATIONS

This application claims benefit of priority under 35 U.S.C. § 119 to Chinese Patent Application No. 202210910556.9, filed on Jul. 29, 2022, and to Chinese Patent Application No. 202211505179.7, filed on Nov. 28, 2022, in the China National Intellectual Property Administration, the disclosures of which are incorporated by reference herein in their entireties.

BACKGROUND

1. Field

The present disclosure relates generally to artificial intelligence, and more particularly, to a method of audio signal processing executed by an electronic device, an electronic device, and a storage medium.

2. Description of Related Art

With the development of science and technology and the improvement of people's living standards, audio detection and recognition has been widely used in various related application scenarios. For example, users may issue instructions by voice, and related electronic devices may perform corresponding operations by detecting and recognizing the voices of the users.

Consequently, the classification and detection of audio signals (e.g., the detection and distinction between voice signals and non-voice signals) has become one of important research topics in the field of audio detection. Although classification and detection of audio signals has been realized by many related technologies, there exists a need for further improvements in audio detection technology, as the need for the detection and distinction between voice signals and non-voice signals continues to increase. Improvements are presented herein. These improvements may also be applicable to other signal processing technologies and the standards that employ these technologies.

SUMMARY

Various aspects of the present disclosure provide a method executed by an electronic device, by which the detection effect of audio signals may be improved when compared to related audio detection methods. Various aspects of the present disclosure provide an electronic device that may execute a method by which the detection effect of audio signals may be improved when compared to related audio detection methods. The following presents a simplified summary of one or more aspects in order to provide a basic understanding of such aspects.

According to an aspect of the present disclosure, a method of audio signal processing executed by an electronic device is provided. The method includes obtaining guidance features corresponding to an audio signal to be processed. The guidance features indicate distinguishable features of at least one signal type of at least one signal category. The method further includes extracting, according to the guidance features, target audio features corresponding to the audio signal. The method further includes determining, according to the target audio features, a target signal type of the audio signal from among the at least one signal type of the at least one signal category. The method further includes controlling, based on the target signal type of the audio signal, an external electronic device.

According to an aspect of the present disclosure, a method of audio signal processing executed by an electronic device is provided. The method includes obtaining a first audio signal to be processed. The method further includes performing signal processing on the first audio signal to obtain a second audio signal. The performing of the signal processing includes at least one of signal spreading and signal enhancement. The method further includes determining a signal detection result of the first audio signal based on at least one of the first audio signal the second audio signal. The signal detection result indicates a target signal type of the first audio signal from among a plurality of candidate signal types. The method further includes controlling, based on the signal detection result of the first audio signal, an external electronic device.

According to an aspect of the present disclosure, a method of audio signal processing executed by an electronic device is provided. The method includes obtaining an audio signal to be processed that has been collected by an audio collection device. The method further includes determining a signal detection result of the audio signal to be processed based on the audio signal to be processed. The audio signal to be processed includes at least one audio frame. The signal detection result includes a target signal type of each of the at least one audio frame. The target signal type of one frame of audio signal is determined by a method provided by an embodiment of the present disclosure. The method further includes performing corresponding processing according to the signal detection result.

According to an aspect of the present disclosure, an electronic device is provided. The electronic device includes a memory storing computer-executable instructions for audio signal processing, and a processor communicatively coupled to the memory. The computer-executable instructions stored in the memory are configured, when executed by the processor, to cause the processor to perform a method provided by an embodiment of the present disclosure.

According to an aspect of the present disclosure, a non-transitory computer-readable storage medium is provided. The non-transitory computer-readable storage medium storing a computer program for audio signal processing that, when executed by a processor of an electronic device, causes the processor to execute a method provided by an embodiment of the present disclosure.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a schematic diagram of audio signals of a variety of different categories, according to an embodiment;

FIG. 10 is a schematic comparison diagram of detection effects of an audio signal, according to an embodiment;

FIG. 15 is a schematic comparison diagram of audio signals of a variety of coarse categories, according to an embodiment;

FIG. 16 is a schematic comparison diagram of features of audio signals of two different categories, according to an embodiment;

DETAILED DESCRIPTION

Figure 1:
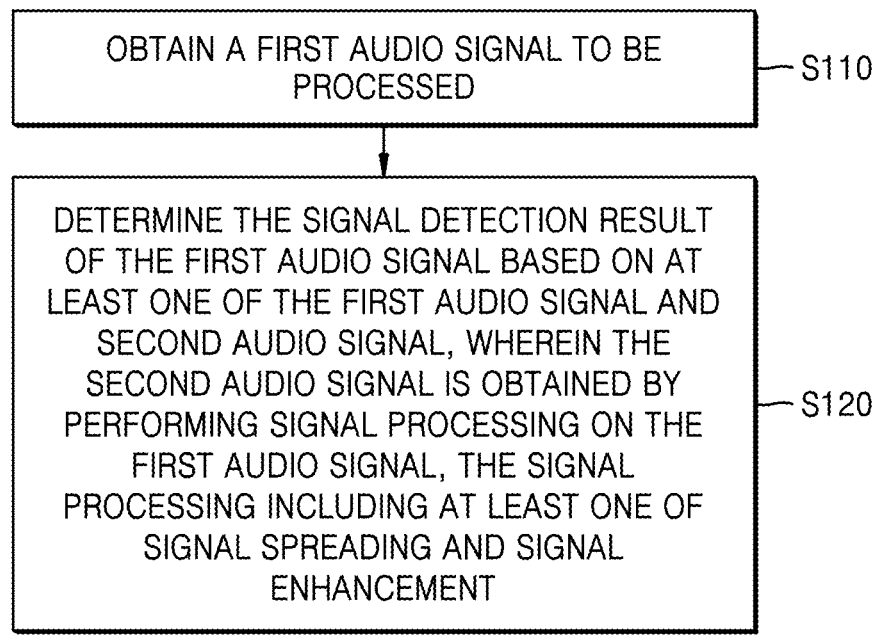
FIG. 1 is a schematic flowchart of a method executed by an electronic device, according to an embodiment.

Embodiments of the present disclosure are described below in connection with the accompanying drawings in the present disclosure. It should be understood that the embodiments set forth below in conjunction with the accompanying drawings are exemplary descriptions for the purpose of explaining the technical solutions of the embodiments of the present disclosure and do not constitute a limitation of the technical solutions of the embodiments of the present disclosure.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art are to recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise.

It should be understood by one person of ordinary skill in the art that singular forms "a", "an", "the", and "said" may be intended to include plural forms as well, unless otherwise stated. It should be further understood that the terms "include" and "including" used in the embodiments of the present disclosure mean that corresponding features may be implemented as presented features, information, data, steps, operations, elements and/or components, but do not exclude implementations of other features, information, data, steps, operations, elements, components, and/or combinations thereof, etc., as supported in the art. It is to be understood that when referring to an element as being "connected" or "coupled" to another element, the one element may be directly connected or coupled to the other element, or the one element and the other element may be intervening through intervening elements to establish a connection relationship. In addition, "connected to" or "coupled to" as used herein may comprise wireless connection or coupling. The term "and/or" as used herein indicates at least one of the items defined by the term, for example, "A and/or B" may be implemented as "A", or as "B", or as "A and B". When describing multiple (two or more) items, if the relationship between multiple items is not explicitly defined, the multiple items may refer to one, more than one or all of the multiple items, for example, the description of "parameter A includes A1, A2, A3" may be realized as parameter A includes A1 or A2 or A3. It may also be realized that parameter A includes at least two of the three parameters A1, A2, A3.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Hereinafter, various embodiments of the present disclosure are described with reference to the accompanying drawings.

An embodiment of the present disclosure provides an audio signal processing method. Based on this audio signal processing method, when detecting the signal type of an audio signal (e.g., detecting whether the audio signal is a voice signal), an electronic device may obtain better detection effects when compared to related audio signal processing methods. By this method, the signal type to which an audio signal belongs may be more accurately detected, in comparison with related methodologies. For example, an electronic device may determine whether an audio signal is "voice" (e.g., the sound a person makes when speaking) or "human body sound" that is not a voice (e.g., a non-voice sound from the body, such as, but not limited to, a sound produced by people coughing, people humming, or a vibration).

The detection of human body sound may be widely used in various scenarios. For example, it may be applied to wearable devices (e.g., Bluetooth headsets). Human body sound detection may automatically detect the state of the wearer and the environment where the wearer is located, thus the devices may be intelligently controlled, so that users may get a comfortable user experience. For example, human body sound detection may be used to control the switchover between the headset modes according to the detection results, such as, but not limited to, from the transparent mode to the noise reduction mode, or from the noise reduction mode to the transparent mode. For another example, the human body sound detection may also be applied to health monitoring. In such an example, the human body sound on the wearable device may feed back the health state of a person. That is, the human body data in the motion state or sleep state may be recorded to give an analysis report, to thus detect the user's physiological abnormalities and give feedback. As such, human body sound detection may prove useful in the field of intelligent health monitoring.

In the related audio signal detection technologies, the accuracy of the detection results may need to be improved. That is, the related detection effect may not provide results with a sufficient accuracy, in particular, in applications where a high detection accuracy may be required and/or in the fine classification of signals. For example, in an application scenario where it may be needed to determine whether an audio signal is "voice" or "human body sound", related audio signal detection technologies may be unable to determine whether sound from a human being is "voice" or "human body sound". Even if some related audio signal detection technologies may be able to make that determination, these related audio signal detection technologies may have a high implementation complexity and/or a low accuracy of detection results, and, as such, may need to be improved. Due to such detection technologies based on fine classification of sound and voice, higher requirements may be proposed on the input signals and the development of detection methods, and correspondingly the judgment on the user state may be more accurate.

In order to improve problems existing in the related audio processing devices, embodiments of the present disclosure provide a method to be executed by an electronic device that may better meet the higher requirements being imposed on the related detection methods.

The technical solutions of the embodiments of the present disclosure and the technical effects produced by the technical solutions of the present disclosure are described below by describing several exemplary implementations. It should be noted that the following implementations may refer to, learn from, or combine with each other, and the same terms, similar features, and similar implementation steps in different implementations are not described repeatedly.

FIG. 1 is a schematic flowchart of a method executed by an electronic device according to an embodiment of the present disclosure. This method may be executed by any electronic device, for example, an electronic device equipped with an audio collection device, or may be executed by other electronic devices such as an electronic device connected in communication to an audio collection device. As shown in FIG. 1, the method may include operation S110 and operation S120.

In operation S110, the electronic device obtains a first audio signal to be processed.

In operation S120, the electronic device determines the signal detection result of the first audio signal based on the first audio signal and/or second audio signal. The signal detection result indicates a target signal type of a first audio signal among various candidate signal types. The second audio signal is obtained by performing signal processing on the first audio signal. The signal processing includes at least one of signal spreading and signal enhancement.

The various candidate signal types include at least two signal types. The specific division of signal types is not limited in the present disclosure and may be determined according to the particular application and design constraints imposed on the overall system. For example, in an application scenario where it is needed to determine whether an audio signal is a voice signal, the candidate signal types may include two signal types, such as, but not limited to, voice signal and non-voice signal.

In an embodiment, the first audio signal may be a signal to be processed. The way of obtaining the first audio signal is not limited in the present disclosure. For example, the first audio signal may be an audio signal collected by a body-conducted audio collection device. The body-conducted audio collection device may include, but not be limited to, bone-conducted audio collection devices, such as bone-conducted pickups (e.g., bone-conducted audio collectors) Correspondingly, the first audio signal may be a bone-conducted audio signal (hereinafter referred to as a bone-conducted signal). Alternatively or additionally, the first audio signal may also be a signal collected by an audio collection device of other types, for example, an audio signal collected by a microphone (referred to as microphone signal).

In an embodiment, the second audio signal may be obtained by performing signal processing on the first audio signal. The signal processing may be, but not limited to, at least one of the following: signal enhancement of the first audio signal and signal spreading of the first audio signal. With respect to the second audio signal, the first audio signal may be referred to as the original audio signal. The second audio signal may be a signal obtained after correspondingly processing the original audio signal. The specific implementations for signal enhancement or signal spreading are not limited in the present disclosure. For example, the signal processing may be implemented based on commonly used signal enhancement or bandwidth spreading techniques.

In an optional or additional embodiment, the second audio signal may include at least one audio signal. Each audio signal in the second audio signal may correspond to one signal processing method. The one signal processing method may include, but not be limited to, at least one of signal enhancement and signal spreading. For example, the second audio signal may include two audio signals. In such an example, one audio signal may be obtained by enhancing the first audio signal, and the other audio signal may be obtained by spreading the first audio signal. Alternatively or additionally, one audio signal may be obtained by enhancing and spreading the first audio signal, and the other audio signal may be obtained by enhancing the first audio signal. When multiple processing methods are used, different execution orders of the multiple processing methods may lead to different result. Therefore, the second audio signal obtained by using the same multiple processing methods but in different execution orders may be used as one second audio signal.

In another optional or additional embodiment, the second audio signal may include at least one of the fourth audio signal, the fifth audio signal, the sixth audio signal, the seventh audio signal, the eighth audio signal, and the ninth audio signal. The fourth audio signal may be obtained by enhancing the first audio signal. The fifth audio signal may be obtained by spreading the first audio signal and then enhancing the spread audio signal. The sixth audio signal may be obtained by enhancing the first audio signal and then spreading the enhanced audio signal. The seventh audio signal may be obtained by spreading and enhancing the first audio signal and then filtering the high-frequency information from the processed audio signal. The eighth audio signal may be obtained by spreading the first audio signal. The ninth audio signal may be obtained by spreading and enhancing the first audio signal and then filtering the low-frequency information from the processed audio signal.

Performing signal spreading on a signal may refer to extending the signal frequency domain of the signal. That is, the bandwidth of the signal may be extended. For example, for a bone-conducted signal, the high-frequency part of the bone-conducted signal may be missing and the energy level of the signal may be weak. For example, the frequency of the bandwidth of a common signal obtained from an external microphone may be as high as 8 kilohertz (kHz), while the frequency of the bone-conducted signal may typically be below 1 kHz. Performing bandwidth extension on a signal may refer to supplementing the high-frequency part of the signal (e.g., the bone-conducted signal).

In a scenario where it is needed to distinguish voice signals from non-voice signals, some non-voice signals may be well distinguished from voice signals in the low-frequency part, whereas some non-voice signals may be well distinguished from voice signals in the high-frequency part. Thus, for audio signals obtained by signal spreading, it may be helpful to detect non-voice signals whose low-frequency part is similar to voice signals and high-frequency part is distinguishable from voice signals.

The energy of the signal may be enhanced using signal enhancement, which may avoid the missed detection of the signal due to its weak energy. For example, for the low-frequency part of an audio signal (e.g., the original bone-conducted signal may typically only have the low-frequency part), the energy of the effective information of the low-frequency part may sometimes be weak. That is, if the audio signal is not enhanced, the audio signal may be difficult to be detected. Consequently, a low-energy audio signal may influence the accuracy of a detection result. Therefore, by performing signal processing on the first audio signal by at least one of signal spreading and signal enhancement, the accuracy of a final detection effect may be better ensured.

In an embodiment, the fifth audio signal may be obtained by performing signal processing on the first audio signal by bandwidth extension and then enhancing the signal subjected to the bandwidth extension. In this way, both the low-frequency part and the high-frequency part of the extended signal may be enhanced, which may be referred to as a full-frequency enhanced signal. The seventh audio signal may be obtained by removing the high-frequency part of the full-frequency enhanced signal. In this way, a signal whose low-frequency part is effectively enhanced may be obtained. The sixth audio signal may be obtained by first enhancing the original audio signal and then extending the enhanced signal. In this way, a signal with extended bandwidth and enhanced energy may be obtained.

In an embodiment, the first audio signal may be an audio signal that has been collected by a body-conducted audio collection device (e.g., a bone-conducted signal). Alternatively or additionally, the second audio signal may include at least the fifth audio signal and the seventh audio signal, as described above.

An embodiment may further provide a signal enhancement solution by inputting an audio signal to be enhanced to a signal enhanced network to obtain an enhanced audio signal, wherein the signal enhanced network comprises one cascaded one-dimensional convolutional layer or multiple cascaded one-dimensional convolutional layers.

It may be understood that the signal enhanced network is a neural network that has been trained based on training samples. That is, the input signal may be enhanced by the enhanced network provided in the embodiment. For example, the high-frequency part of the bone-conducted signal may be supplemented by bandwidth extension, and the bone-conducted signal subjected to the bandwidth extension may be further enhanced through the signal enhanced network. Through this solution, the enhanced signal may be as similar as possible to a signal recorded by an external microphone, which may be more conducive to improving the subsequent detection result.

The specific network structure of the signal enhanced network is not limited in the present disclosure and may be configured according to design preferences and design constraints imposed on the overall system. For example, the convolutional layer of the signal enhancement network may be composed of one layer or multiple cascaded layers. Alternatively or additionally, in order to improve the model performance of the signal enhanced network, the signal enhanced network may include at least two cascaded convolutional layers. In some embodiments, an activation function layer may be connected between at least two adjacent convolutional layers in the at least two convolutional layers to increase the non-linear relationship between the convolutional layers.

The training method of the enhanced network is not limited in the present disclosure. For example, the initial neural network may be continuously trained based on a large number of audio samples, until the number of training times reaches the set number or the training loss of the model converges, and the like, to obtain a trained enhanced network.

Each audio sample may include two audio signals, which may be referred to as a first sample signal and a second sample signal, respectively. The first sample signal may be a sample signal that needs to be enhanced, and the second sample signal may be an enhanced signal corresponding to the first sample signal. During training, the first sample signal in each sample may be input into the neural network to obtain an enhanced signal through network processing. The training loss may be calculated according to the difference between the enhanced signal output by the network and the second sample signal corresponding to the first sample signal. The model parameters of the neural network may be adjusted based on the training loss. By continuously performing the above training process until the preset training end conditions are met, an enhanced network that meets the application requirements may be obtained. That is, through continuous training, the enhanced signal output by the network, corresponding to the first sample signal, may become closer to the second sample signal corresponding to the first sample signal.

The audio signal processing method provided in the present disclosure may determine the signal type of an audio signal with an accuracy level that may meet the detection needs of audio signals in various scenarios. For example, the provided audio signal processing method may be applied to a scenario where it is needed to determine whether an audio signal is a voice signal. The voice signal may refer to a signal generated when a person speaks, and the non-voice signal may refer to a signal other than a signal generated when a person speaks. For example, "non-human sound" may refer to sound produced by the environment, the audio collection device itself, the non-voice human body sound produced by people coughing, people humming, and/or vibration.

In some embodiments, the audio signal processing method may include filtering the DC bias in the first audio signal to obtain a third audio signal, wherein the second audio signal is obtained by performing signal processing on the third audio signal, and/or the signal detection result is determined based on the third audio signal and/or the second audio signal.

That is, before detecting the signal type based on the first audio signal, the first audio signal may be preprocessed, and the preprocessing may include filtering the DC bias in the first audio signal. When the audio signal is detected, the DC bias in the audio signal may cause interference, and it is likely to occur in multiple links. For example, when the second audio signal is obtained based on the first audio signal, if the first audio signal is subjected to signal spreading (e.g., bandwidth extension) during the supplementation of the high-frequency information in the signal and enhancement of the signal energy by bandwidth extension, the existence of the DC bias may have an adverse effect on the recovery of the high-frequency information. For another example, when the first audio signal is enhanced by signal enhancement and then detection is performed based on the enhanced signal, the use of a signal obtained by signal enhancement of the first audio signal from which the DC bias has been filtered may produce a more accurate detection result than the use of an enhanced signal obtained by signal enhancement before filtering the DC bias from the first audio signal. That is, the DC bias may also cause interference during the signal enhancement.

When a category detection result is obtained through a classification model based on the audio signal, the classification model may first extract features of an input audio signal (e.g., audio features of the signal, such as, but not limited to, spectral features) through its feature extraction layer, and may then determine the classification result of the signal (e.g., voice signal or non-voice signal) based on the extracted features. The existence of DC bias may cause adverse interference to the expression ability of the features extracted by the classification model, resulting in a decrease in the discrimination of the extracted features, thereby affecting the detection result.

Therefore, in order to potentially improve the accuracy of the final signal detection result of the first audio signal, the DC bias in the audio signal may be filtered. For example, when the second audio signal is obtained based on the first audio signal, the first audio signal from which the DC bias has been filtered (e.g., the third audio signal) may be subjected to signal processing to obtain the second audio signal. When the first detection result is determined based on the first audio signal, the first detection result may be determined according to the third audio signal. At least one of the fourth audio signal, the fifth audio signal, the sixth audio signal, the seventh audio signal, the eighth audio signal and the ninth audio signal in the foregoing may be obtained by subjecting the third audio signal to corresponding signal processing. For example, the fourth audio signal may be obtained by enhancing the third audio signal.

In an optional or additional embodiment, the second audio signal may include at least one audio signal. Each audio signal may correspond to one signal processing method. The various candidate signal types may include at least two signal types. Each signal type may include at least one subtype. For example, the determining of a signal type of the first audio signal from among the various candidate signal types based on the first audio signal and/or second audio signal may include determining a first detection result based on the first audio signal, and/or, determining a second detection result corresponding to the audio signal based on at least one audio signal in a second audio signal, determining the signal detection result according to the first detection result and/or each second detection result, wherein one detection result corresponds to one subtype, and one detection result indicates whether a first audio signal belongs to a corresponding subtype.

In an embodiment, each signal type may include one or more signal subtypes. That is, a signal type may include one subtype, and the signal type is a subtype. A signal type may also include multiple subtypes. The division of subtypes of a signal type is not limited in the present disclosure. For example, for a signal type, clustering analysis may be performed based on a large number of sample audio signals belonging to this type. These sample signals are clustered into one or more categories according to the spectral features of the audio signals. Each category may be used as one subtype of this signal type.

In an embodiment, the final signal detection result may be obtained based on the detection result of at least one audio signal in the original audio signal and its corresponding processed second audio signal. There may be multiple second detection results, and each second detection result may be determined based on an audio signal included in the second audio signal. Each of the first detection result and the second detection results may correspond to one subtype, and it may be known whether the first audio signal belongs to the corresponding subtype according to one detection result.

In optional or additional embodiments, since the audio features of some audio signals of different types are relatively similar, for example, the spectral features of audio signals of some subtypes of a certain type are very similar to the spectral features of audio signals of other types (or subtypes of other types), the signal detection may be complex. In order to reduce the complexity of signal detection and achieve high detection accuracy, the method provided in the present disclosure may further subdivide a signal type by decomposing a complex large issue into multiple small issues. Each signal type may be subdivided into one or more subtypes. When detecting the first audio signal, corresponding detection results may be obtained based on at least one of the first audio signal and the second audio signal. According to each detection result, high accuracy may be achieved in a subtype. That is, it may be determined whether the first audio signal belongs to a corresponding subtype according to a detection result, so that the final detection result may be improved.

Alternatively or additionally, the first detection result and the second detection result may be obtained by a classification model, and each subtype may correspond to a respective classification model.

The classification model may be a binary classification model. One binary classification model may correspond to one subtype. A detection result from the binary classification model may indicate whether the first audio signal belongs to a subtype corresponding to the model. Alternatively or additionally, the number of classification models may be the total number of subtypes minus one (1). The input signal corresponding to a classification model may be the first audio signal or an audio signal in the second audio signal.

In an optional or additional embodiment, by decomposing a complex large issue (e.g., signal type) into multiple small issues (e.g., subtypes), a subtype corresponds to a classification model, so that each classification model may achieve high accuracy in a certain subtype, which may increase the accuracy of the final signal detection result of the audio signal.

Each classification model may be obtained by training the initial binary classification model with its corresponding training set. The training set corresponding to a classification model may include multiple positive samples and multiple negative samples. The positive samples are sample audio signals of a subtype corresponding to the model, and the negative samples are sample audio signals not belonging to the subtype corresponding to the model. Alternatively or additionally, the negative samples may include sample audio signals of subtypes other than the subtype corresponding to the model. Continuous training may enable the trained classification model to distinguish whether the signal type of an audio signal to be detected is the subtype corresponding to the model. That is, the trained classification model may distinguish whether the signal type of the audio signal is the signal type to which the subtype belongs. For example, if the input signal corresponding to a classification model is the first audio signal, when the model is obtained through training, the input signal (e.g., sample audio signal) corresponding to the initial classification model to be trained may also be the original sample audio signal. If the input signal corresponding to a classification model is a second audio signal, the sample audio signal corresponding to the model may also be a signal obtained by subjecting the original sample audio signal to the same signal processing.

Determining the signal detection result of the first audio signal based on the first audio signal and/or the second audio signal may include any one of the following.

Method 1: determining detection results corresponding to audio signals to be detected respectively based on the audio signals to be detected. The audio signals to be detected comprising a first audio signal and a second audio signal.

Method 2: in a set order, processing audio signals to be detected in sequence in the following way until the detection result of the current audio signal to be detected indicates that the first audio signal belongs to a candidate signal type: determining the detection result of the current audio signal to be detected based on the current audio signal to be detected.

In Method 1, the signals to be detected may be detected to obtain corresponding detection results. For example, the classification model corresponding to each subtype may perform signal detection to obtain corresponding detection results. The input from the classification model may be the first audio signal or any audio signal in the second audio signal. After the detection results corresponding to the model are obtained, the target signal type of the first audio signal may be determined by summarizing multiple category detection results. By this method, multiple classification models may be used to perform parallel detection of signals. Even if it is failed to determine the target signal type of the first audio signal based on the detection results of some models in at least two classification models, the category detection results of classification models other than these models may be obtained in parallel. This may speed up the obtaining of the final signal detection result.

In Method 2, the detection results of signals to be detected may be determined in a set order. In this method, if the detection result of a certain audio signal shows that the first audio signal belongs to a subtype corresponding to this signal, then it may be determined that the target signal type of the first audio signal is the signal type to which the subtype belongs, and at this point, the detection of the signal may end. The specific setting manner of the set order is not limited in the present disclosure, and may be configured according to design preferences and design constraints imposed on the overall system. For example, in a set order, the category detection results of the first audio signal may be determined in sequence through the classification models corresponding to subtypes, until the category detection result of a classification model indicates that the signal type of the first audio signal is the signal type corresponding to the model or the category detection results of the classification models have been obtained. When it is determined, according to the detection result of a certain classification model, that the first audio signal belongs to the subtype corresponding to the model, it may be determined that the target signal type to which the first audio signal belongs is the signal type to which the subtype belongs. If the detection results of the classification models all show that the first audio signal does not belong to the subtype corresponding to any model, it may be determined that the first audio signal belongs to a subtype other than the subtypes corresponding to the models.

Taking candidate signal types including voice signals and non-voice signals as an example, assuming that non-voice signals may be divided into three (3) categories according to the spectral features of the signals, then the non-voice signal type includes three (3) subtypes and the three (3) subtypes belong to the non-voice signal type. In an application scenario where it is necessary to determine whether the first audio signal is a voice signal, the signal subtype includes three (3) subtypes of the non-voice signal type and one (1) subtype of one (1) voice signal type. That is, the voice type may be used as a subtype, and not further fine-grained divided. In this example, optionally, each non-voice subtype may correspond to one classification model. If it is determined, based on the detection results of the three classification models, that the first audio signal does not belong to any non-voice signal type, it may be determined that the target signal type of the first audio signal is the voice signal type.

Figure 3:
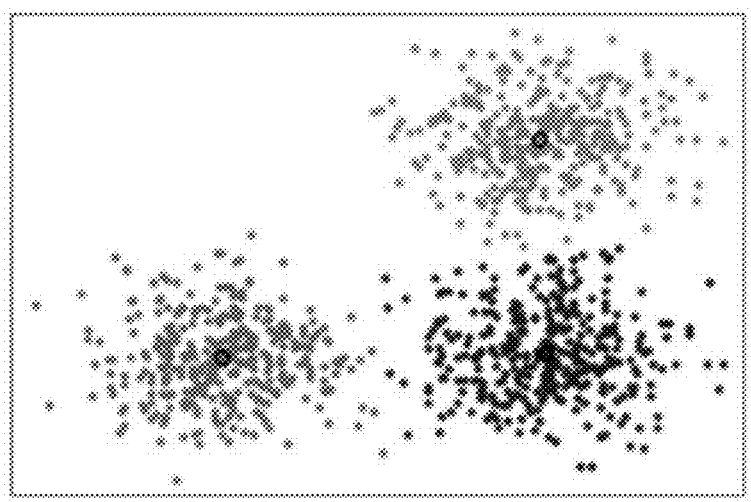
FIG. 3 is a schematic diagram of clustering results of non-voice signals, according to an embodiment.

The solutions in the foregoing embodiments of the present disclosure may be applied to any application scenario where signal type detection is required. In order to better understand and illustrate the solution of the present disclosure, an optional embodiment of the present disclosure is described below in conjunction with a specific detection scenario where signal types may include voice signals and non-voice signals. As an example, FIG. 2 shows a schematic diagram of a subdivided variety of common sources of non-voice signals and voice signals. As shown in FIG. 2, the schematic diagram shows a total of 27 possible sources of audio signals, including 23 sources of non-voice signals and four (4) sources of voice signals. What is shown in FIG. 2 is a relatively fine-grained division method. There are 23 types of non-voice signals. Clustering the spectral features of a large number of sample signals of these 23 non-voice signals indicates that they may be clustered into three categories as shown in FIG. 3. Based on the original categories of the three categories of sample signals, the 23 types of fine-grained non-voice signals may be classified into three categories: vibration, cough, and hum. The three categories are obtained by a relatively coarse-grained division method. In this example, the non-voice signal type is divided into three subtypes and each category is a subtype.

In many practical application scenarios, there is a need to detect whether an audio signal is a voice signal or a non-voice signal. By the audio signal processing method provided in the present disclosure, after obtaining the first audio signal to be detected, it may be determined whether the audio signal is a voice signal or a non-voice signal based on the audio signal and/or the second audio signal obtained by subjecting the audio signal to at least one of signal enhancement and signal spreading.

In a scenario where it is necessary to detect whether an audio signal is a voice signal, the signal detection result of the first audio signal indicates whether the target signal type of the first audio signal is the voice signal type.

The voice signal type may include one or more subtypes, the non-voice signal type may include one or more subtypes, and at least one type of the two signal types includes at least two subtypes.

In an embodiment, at least one detection result may be determined based on the first audio signal and/or the second audio signal, and the signal detection result of the first audio signal is determined according to the at least one detection result. A category detection result may correspond to one of multiple subtypes included in the voice signal type and the non-voice signal type (e.g., different category detection results may correspond to different subtypes), and specifically, it may indicate whether the first audio signal belongs to the corresponding subtype. The non-voice signals shown in FIG. 3 may be divided into three subtypes: vibration-like non-voice signals, cough-like non-voice signals, and hum-like non-voice signals. Alternatively or additionally, the voice signals may be classified into a subtype. In this example, a category detection result may indicate whether the first audio signal is a vibration-like non-voice signal.

In an embodiment, each detection result in the at least one detection result may be determined according to the first audio signal. In an optional or additional embodiment, each detection result may be determined according to the second audio signal. Each detection result may correspond to the same second audio signal. Alternatively or additionally, each detection result may correspond to different second audio signals. For example, one detection result is determined according to the third audio signal, and one detection result is determined according to the fourth audio signal. For another example, some of the detection results are determined according to the first audio signal, and some of the detection results are determined according to the second audio signal.

For the convenience of description, the detection result determined based on the first audio signal is referred to as the first detection result, and the detection result determined based on the second audio signal is referred to as the second detection result. The signal detection result of the first audio signal may be determined based on the first detection result and/or the second detection result.

As an optional or additional method, detection may be performed based on one of the first audio signal and the second audio signal to obtain a detection result a of the audio signal. If the detection result a shows that the original audio signal is a non-voice signal (e.g., vibration-like non-voice signal), the detection result a may be used as the final signal detection result, that is, the original voice signal is a non-voice signal. If the detection result a indicates that the original audio signal is not a non-voice signal (e.g., not a vibration-like non-voice signal), since non-voice signals may be generated by various reasons, in order to avoid recognizing one or some non-voice signals similar to voice signals as voice signals, the first audio signal or the second audio signal may be further detected to obtain another detection result b. According to the detection result b, it is further determined whether the original audio signal is a non-voice signal. If the detection result b indicates that the original audio signal is a voice signal, then the final signal detection result shows that the original audio signal is a voice signal, and if the detection result b shows that the original audio signal is a non-voice signal, then the final signal detection result shows that the original audio signal is a non-voice signal.

When this optional or additional method is used, optionally, the first audio signal may be detected first to obtain the first detection result of the first audio signal. If the first detection result shows that the first audio signal is a non-voice signal, there may be no need to subject the first audio signal to additional signal processing to obtain the second audio signal, because at this time it may have been determined that the final signal detection result shows that the first audio signal is a non-voice signal. If the first detection result shows that the first audio signal is not a non-voice signal, the first audio signal may be subjected to signal processing to obtain a second audio signal, and then the second audio signal is detected. The final signal detection result is further determined according to the second detection result.

After the first audio signal is obtained, it may be possible to detect whether the first audio signal is a voice signal, and also perform the operation of obtaining the second audio signal. In this way, the detection of the second audio signal may be performed as soon as possible when the first detection result shows that it is a voice signal. This may speed up the obtaining of the final signal detection result.

As described above, the second audio signal may include one or more audio signals, and determining the signal detection result of the first audio signal may include, for audio signals in the first audio signal and/or the second audio signal, in a second set order, processing audio signals in sequence in the following way until the detection result of the current audio signal indicates that the first audio signal is a non-voice signal or audio signals all have been detected, and determining the detection result of the current audio signal based on the current audio signal.

The specific setting manner of the second set order is not limited in the present disclosure, and may be configured according to experimental values, empirical values, or otherwise predetermined values. For ease of description, it may be assumed that the second audio signal includes two audio signals, for example, the fourth audio signal and fifth audio signal. The detection order of the first audio signal, the fourth audio signal, and the fifth audio signal may be preset, and the detection starts from the first signal in this order. If the detection result of this signal shows that the first audio signal is a non-voice signal, there is no need to detect the following two signals. If the detection result of the first signal shows that the first audio signal is a voice signal, the second signal is detected until the detection result of the currently detected signal shows that it is a non-voice signal or the detection of all three signals is completed.

As another optional or additional embodiment, the first detection result may be determined based on the first audio signal, and the second detection result may be determined based on the second audio signal, according to the first detection result and the second detection result, the detection result of the first audio signal may be determined.

In this optional or additional embodiment, the detection of the first audio signal and the second audio signal may not be limited in sequence. For example, optionally, the detection may be performed in parallel. By this embodiment, the detection of the voice signal may be accelerated. In this embodiment, when both the first detection result and the second detection result show that the first audio signal is a voice signal (that is, both show that the first audio signal is not a non-voice signal), it is determined that the final detection result of the first audio signal shows that it is a voice signal. If there is a detection result indicating that the first audio signal is a non-voice signal in the first detection result and the second detection result, it is determined that the final detection result of the first audio signal shows that it is a non-voice signal.

In some embodiments, the signal difference between voice signals and different types of non-voice signals may typically be different. Some non-voice signals and voice signals are similar at low frequencies, while some non-voice signals and voice signals are similar at high frequencies. From this point of view, by the audio signal processing method provided in the present disclosure, the determination of non-voice signals as voice signals may be effectively avoided based on two different audio signals: the original audio signal and the second audio signal obtained after processing the original audio signal. It is possible to determine whether an audio signal is a voice signal from a variety of different dimensions. Consequently, the accuracy of audio signal detection may be improved.

When determining the final signal detection result of the first audio signal based on the first audio signal and the second audio signal, in addition to the above-mentioned method of separately determining the first detection result and/or the second detection result, it is also possible to combine the first audio signal and the second audio signal to determine the final signal detection result. For example, it may be possible to extract the audio features (e.g., spectral features) of the first audio signal and the audio features of the second audio signal, fuse (e.g., concatenate) these audio features, and determine the signal detection result based on the fused features. Since these audio features may cover signal features of different dimensions, the accuracy of the final detection result may also be improved based on the fused features.

The determination of the various detection results may be realized based on artificial intelligence. Because the audio signal detection in the above-mentioned scenario embodiments of the present disclosure is to determine whether the first audio signal is a voice signal, the audio signal detection issue may be regarded as a classification issue, in which one category (e.g., signal type) corresponds to the voice signal, and the other category (e.g., signal type) corresponds to the non-voice signal. A binary classification model that meets the application needs may be obtained based on training samples. The detection result of the audio signal may be obtained through the binary classification model. For example, the prediction result from the classification model may be one (1) or zero (0), where one (1) indicates that the audio signal is a voice signal and zero (0) indicates that the audio signal is a non-voice signal. Alternatively or additionally, it is possible that zero (0) indicates that the audio signal is a voice signal and one (1) indicates that the audio signal is a non-voice signal. In some embodiments, the detection result from the model may show a probability value that the first audio signal is a voice signal and a probability value that the first audio signal is a non-voice signal. The sum of the two probability values is one (1), for example. The result corresponding to the larger probability value may be considered as the detection result from the model.

Optionally, any one of the at least one detection result determined based on the first audio signal and/or the second audio signal may be determined in the following way: based on the input signal, the detection result is determined through a classification model, wherein the detection result indicates whether the first audio signal belongs to a subtype corresponding to the classification model.

The first detection result may be determined based on the first audio signal through the first classification model, and the detection result may indicate whether the first audio signal is a non-voice signal of the first type (subtype). The second detection result may be determined based on the second audio signal through the second classification model. The detection result may indicate whether the first audio signal is a non-voice signal of the second type (e.g., subtype).

In an embodiment, the at least two classification models are the first classification model and the second classification model. It may be understood that the first classification model and the second classification model are well-trained classification models that meet requirements. The specific model structure of the first classification model and the second classification model is not limited in the present disclosure, and they may be classification models based on any neural network structure commonly used at present. For example, the classification models may be binary classification models based on a convolutional neural network. The structures of the initial neural network models (e.g., initial classification models to be trained) corresponding to the first classification model and the second classification model may be the same or different. However, it may be understood that the input data to the first classification model corresponds to the first audio signal, and the input data to the second classification model corresponds to the second audio signal.

The input to the classification model is the audio features of the audio signal. The input to the first classification model may be the initial features (e.g., spectral features) of the first audio signal, or the initial features of the signal obtained by preprocessing the first audio signal. Similarly, the input to the second classification model may be the initial features of the second audio signal, or the initial features of the signal obtained by preprocessing the second audio signal.

As another optional manner, the input to the first classification model may be the initial features of the third audio signal, and the input to the second classification model may be the initial features of the second audio signal obtained by subjecting the third audio signal to signal processing.

It may be known from the foregoing description that, in an embodiment of the present disclosure, the second audio signal may include one or more audio signals, and the second detection result of the second audio signal may include at least one detection result, wherein the number of results contained in the second detection result may be equal to or different from the number of audio signals contained in the second audio signal. Alternatively or additionally, each audio signal in the second audio signal may be detected separately to obtain a detection result corresponding to each audio signal, and one detection result may be obtained based on multiple audio signals.

In an optional embodiment, the second detection result of the second audio signal may be obtained in any of the following methods.

Method 1: determining the detection results corresponding to the audio signals based on the audio signals in the second audio signal, the second detection result including the detection results corresponding to the audio signals in the second audio signal.

Method 2: in a first set order, processing audio signals in the second audio signal in sequence in the following way until the detection result of the current audio signal indicates that the first audio signal is a non-voice signal or audio signals all have been detected: determining the detection result of the current audio signal based on the current audio signal.

In Method 1, the number of detection results of the second audio signal may be equal to the number of audio signals contained in the second audio signal. For example, the second audio signal includes the fifth audio signal (e.g., a signal obtained by spreading the first audio signal and then enhancing the spread audio signal) and the seventh audio signal (e.g., a signal obtained by spreading and enhancing the first audio signal and then filtering the high-frequency information from the processed audio signal). Correspondingly, the second detection result includes the detection result of the fifth audio signal and the detection result of the seventh audio signal.

When determining the final signal detection result based on multiple detection results (e.g., the first detection result and the second detection result, or multiple second detection results), if the multiple detection results all indicate that the first audio signal is not a non-voice signal, the final signal detection result shows that it is a voice signal. Alternatively or additionally, if any of the multiple detection results indicates that the first audio signal is a non-voice signal, the final signal detection result shows that it is a non-voice signal.

In Method 2, the audio signals in the second audio signal may be detected in sequence in a preset order. If the detection result of any detected signal shows that the first audio signal is a non-voice signal, the detection process ends. That is, an audio signal next to the second audio signal needs to be detected, only when the detection result of the currently detected audio signal shows that the first audio signal is not a non-voice signal. With this solution, the number of detection results contained in the second detection result obtained finally may be equal to or less than the number of signals contained in the second audio signal. When the first audio signal is a non-voice signal, the number of signals to be processed may be effectively reduced. By Method 1, when the first audio signal is a voice signal, the final signal detection result may be obtained relatively quickly.

It may be known from the foregoing description that different classification models in an embodiment of the present disclosure are used to distinguish different subtypes. For example, the first classification model and the second classification model are used to distinguish voice signals from non-voice signals of different types. The difference between the signal features of non-voice signals of different types and the signal features of voice signals may be different. Therefore, by using multiple different classification models corresponding to non-voice signals of different subtypes, more attention may be paid to the difference between non-voice signals of different types and voice signals. Consequently, the final signal detection result may be improved and the recognizing of non-voice signals as voice signals may be avoided. The specific classification of the types of non-voice signals is not limited in the present disclosure. For example, by clustering a large number of non-voice signal samples, these samples may be divided into multiple subtypes, such as, but not limited to the three (3) subtypes shown in FIG. 3.

In an optional or additional embodiment, the non-voice signals may include non-voice signals of multiple different subtypes, and the voice signals form a subtype (that is, the voice signals may not be divided into different subtypes). The number of classification models may be equal to the number of subtypes contained in non-voice signal type. Multiple classification models correspond to multiple subtypes of the non-voice signal type one by one. Optionally, the input to different classification models may be different.

As an optional or additional embodiment, the final signal detection result may be determined according to the first detection result and the second detection result. The first type is one of multiple subtypes, and the second type may include at least one subtype. Correspondingly, the second classification model may include classification models corresponding to subtypes contained in the second type. Alternatively or additionally, each audio signal in the second audio signal corresponds to a subtype, that is, the input to each second classification model may be features of the respective second audio signal.

The audio signal processing method provided in the present disclosure may be applied to any application scenario that needs to distinguish the type of signals, including but not limited to the above-mentioned scenario where it is necessary to determine whether an audio signal is a voice signal. In the solution provided in an embodiment of the present disclosure, the physical features of signals of different types are fully utilized, and/or attention may be paid to the difference at different frequency bands when detecting signals of different subtypes of a same signal type and signals of other signal types (or subtypes of other signal types). Based on the audio signals in the audio signals to be processed, more targeted detection may be realized. For different audio signals, attention may be paid to different frequency band information, thereby improving the accuracy of the detection result. On this basis, the complex audio signal detection task may be split into multiple sub-tasks, which reduces the complexity of the implementation of the solution and the complexity of the model. Consequently, the solution provided in an embodiment of the present disclosure may provide an improvement over related audio processing devices.

In order to better understand and illustrate the above optional solutions provided in the present disclosure, the method is described below in conjunction with a specific optional implementation of the present disclosure.

In an embodiment, the first audio signal is an audio signal collected by a bone-conducted audio collection device (e.g., a bone-conducted headset), which is hereinafter referred to as a bone-conducted signal. The original signal on which the audio signal processing method in the embodiment is based may use only the bone-conducted signal. An enhanced signal (an audio signal in the second audio signal) may be obtained by subjecting the bone-conducted signal to bandwidth extension and/or enhancement. The audio processing process in the embodiment is described below.

Figure 4:
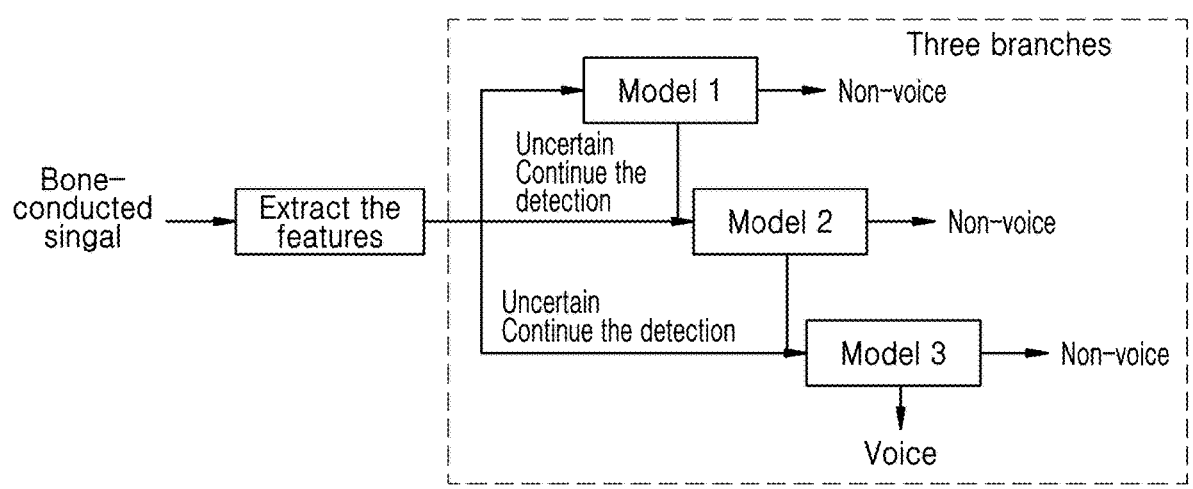
FIG. 4 shows the implementation principle and schematic flowchart of a method executed by an electronic device, according to an embodiment.

FIG. 4 shows a schematic flowchart of an audio signal processing method in an embodiment. As shown in FIG. 4, the signal processing flow realizes the detection of the signal type through a three-branch detector as shown, wherein Model 1, Model 2 and Model 3 are three binary classification models. The non-voice signals include three subtypes. Each of the three models corresponds to a subtype. Each model may detect whether the audio signal belongs to the subtype corresponding to the model.

Referring to FIG. 4, the input signals corresponding to the three classification models are original audio signals (e.g., bone-conducted signals). Optionally, during detection, the three classification models may be used for a cascaded detection process. That is, the three models may be used for detection in a certain order until the signal detection result of the bone-conducted audio signal is determined.

Continuing to refer to FIG. 4, the features of the bone-conducted signal may be extracted first. The extracted features may be used as the input to the three-branch cascaded detection process. The extracted features may be input into Model 1 first. If the detection result from Model 1 shows that the bone-conducted signal is a non-voice signal. That is, the detection result indicates that the first audio signal belongs to a subtype of the non-voice signal type corresponding to Model 1, then the detection process ends. The target signal type of the first audio signal is a non-voice signal.

If the detection result from Model 1 indicates that the bone-conducted signal is not a non-voice signal. That is, it does not belong to the subtype corresponding to the model, the signal type of the bone-conducted signal cannot be determined at this time. In this case, the next detection step is executed, where the extracted features are input into Model 2. According to the detection result from the model, it is determined whether the bone-conducted signal is a non-voice signal (belongs to the subtype corresponding to Model 2). If it is determined that the bone-conducted signal is a non-voice signal, the detection process ends.

If it cannot be determined whether the bone-conducted signal is a non-voice signal according to the detection result, the next detection step is executed, where the extracted features are input to Model 3. If the detection result from the model indicates that the bone-conducted signal is a non-voice signal (that is, the detected signal type is the subtype corresponding to Model 3), it is determined that the bone-conducted signal is a non-voice signal. If the detection result from Model 3 indicates that the bone-conducted signal is not a non-voice signal, it may be determined that the bone-conducted signal is a voice signal.

Figure 5A:
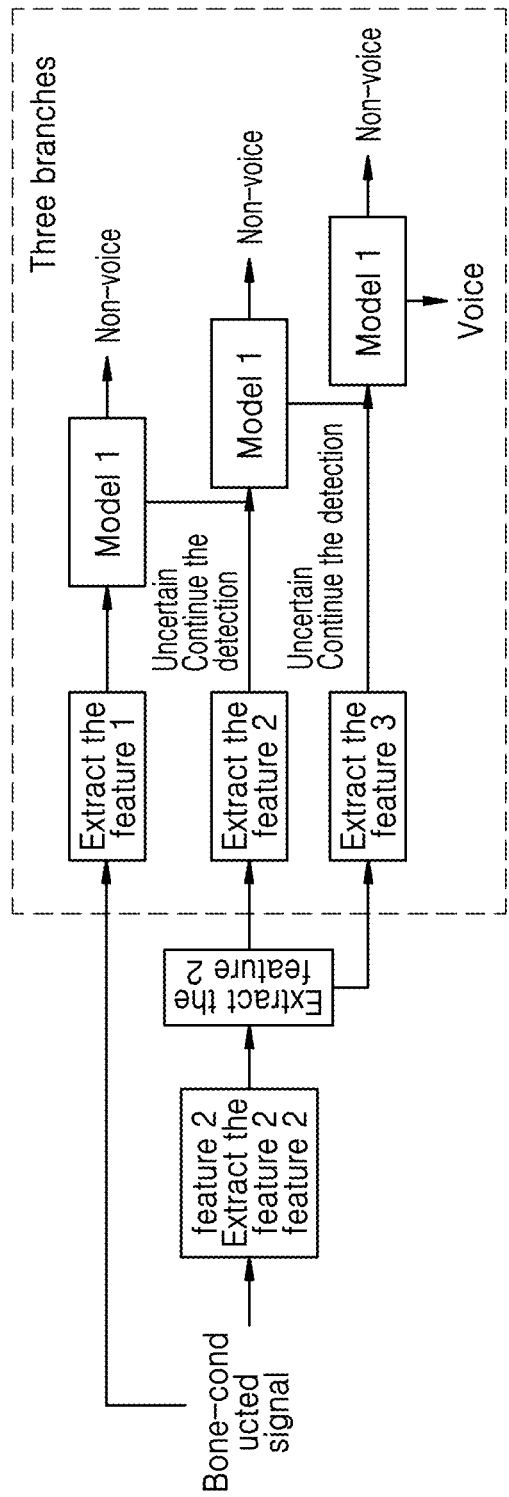
FIG. 5A shows the implementation principle and schematic flowchart of a method executed by an electronic device, according to an embodiment.

FIG. 5A is a schematic flowchart of another audio signal processing method provided in the embodiment. As shown in FIG. 5A, the signal processing flow may include two parts: bandwidth extension (e.g., spreading) and enhancement of signals, and signal detection by the three-branch detector as shown based on the bone-conducted signal and the processed enhanced signal.

Comparing FIG. 4 and FIG. 5A, it may be found that, on the basis of the embodiment in FIG. 5A, the embodiment in FIG. 4 may be obtained by removing the bandwidth extension+enhanced network module. In the embodiment in FIG. 4, the bone-conducted signal may be directly used for signal detection. The bone-conducted signal may not be processed by signal enhancement, bandwidth extension, and the like. Consequently, the detection accuracy of this embodiment may be slightly lower than the embodiment in FIG. 5A. However, in the embodiment in FIG. 4, the complexity of the implementation of the embodiment may be effectively reduced, and it may preferable to ensure that the embodiment may be smoothly run on the embedded chip. In practical applications, the embodiments in FIG. 4 or FIG. 5A may be selected according to design preferences and design constraints imposed on the overall system. Alternatively or additionally, the input features of the three branches in FIG. 4 may be the features of the third audio signal, that is, the signal features after filtering the DC bias from the bone-conducted signal.

As shown in FIG. 5A, the bandwidth extension is configured to extend the high-frequency features of the bone-conducted signal, and the enhanced network is configured to enhance the full frequency domain of the extended bone-conducted signal, which may enhance both the low-frequency part and high-frequency part of the signal. Through bandwidth extension and signal enhancement, the processed signal may be more similar to an audio signal recorded by a common external microphone.

Optionally, the three-branch detector in FIG. 5A uses three different classification models to cover the detection of non-voice signals of different types. Similarly, the three-branch detector may use the three-branch cascaded detection method. That is, the detection may be started through Model 1 in FIG. 5A. If the detection result from Model 1 indicates that the bone-conducted signal is a non-voice signal, the detection process may end. If the detection result from Model 1 indicates that the bone-conducted signal is not a non-voice signal (UNCERTAIN as shown), detection is further executed through Model 2. If the detection result from Model 2 indicates that the bone-conducted signal is a non-voice signal, the detection process ends. Otherwise, detection is further executed through Model 3 to obtain the final detection result. It may be known from the drawing that, if the detection results from Model 1 to Model 3 all indicate that the bone-conducted signal is not a non-voice signal, the final detection result shows that the bone-conducted signal is a voice signal, otherwise the original bone-conducted signal is determined to be a non-voice signal.

In the three-branch cascaded detection method shown in FIG. 5A, for the target difference of the detection task (the difference between non-voice signals of different types and voice signals), three features are designed (the input signals to three branches are different), and three models are used for determination. By the solution provided in the present disclosure, the complex issue of distinguishing multiple voices and multiple non-voice human body sounds may be decomposed into three small issues. As such, a lightweight model may be used to achieve high accuracy in each small issue. Finally, the classification results of the three models are combined to obtain a high-accuracy human body sound detection result within a low-complexity framework. The detection process and the practical value of this detection method are described below with reference to FIG. 5A.

Part 1: Bandwidth extension and signal enhancement of the bone-conducted signal (e.g., bandwidth extension+enhanced network in FIG. 5A).

Compared with an external microphone signal collected by an external microphone, the features of the bone-conducted signal all come from the wearer himself, without interference from the external environment. That is, the bone-conducted signal may be strong in anti-noise ability (e.g., high signal-to-noise ratio). However, bone conduction is different from the general sound conduction method, because the bone-conducted signal is a signal collected when vibration, which is produced when a person is speaking or doing other actions, is transferred to the wearable device through the skull, rather than an audio signal collected by an external microphone during its propagation through the air. According to the propagation features, the bone-conducted signal may have little to no high-frequency information, and the energy of the audio signal may be low. That is, the bone-conducted signal may sound dull. In addition, compared with the external microphone signal, the bone-conducted signal has a strong DC bias. When a related bandwidth extension method is used to process the bone-conducted signal, the DC bias may be preserved, which may cause interference when supplementing the high-frequency information by bandwidth extension.

In order to improve the accuracy of detection, a method for bandwidth extension and enhancement may be designed specifically for the features of the bone-conducted signal. The design framework of this method includes two parts: the first step is to add a module for removing the DC bias, on the basis of the related bandwidth extension, to solve the problem of the DC bias in the bone-conducted signal, and the second step is to train a bone-conducted signal enhanced network, in which the waveform after bandwidth extension is enhanced through a neural network to obtain a waveform signal whose low-frequency information and high-frequency information are both enhanced, that is, the enhanced signal in FIG. 5A. The input to the enhanced network is the bandwidth-extended signal obtained by subjecting the bone-conducted signal to the processing in the first step.

It may be understood that, in actual implementation, only one of the network enhancement step and the bandwidth extension step may be included. For example, only the bandwidth extension step may be included. The signal obtained through this step is used as an audio signal in the second audio signal. Alternatively or additionally, the enhanced network may be a network trained to enhance the bone-conducted signal and/or the bone-conducted signal from which the DC bias has been filtered. The enhanced network may be used to directly enhance the bone-conducted signal, and the enhanced signal may be used as an audio signal in the second audio signal. In an embodiment, the description is given by an implementation in which the bone-conducted signal is first subjected to bandwidth extension and then the signal subjected to bandwidth extension is enhanced.

Figure 6:
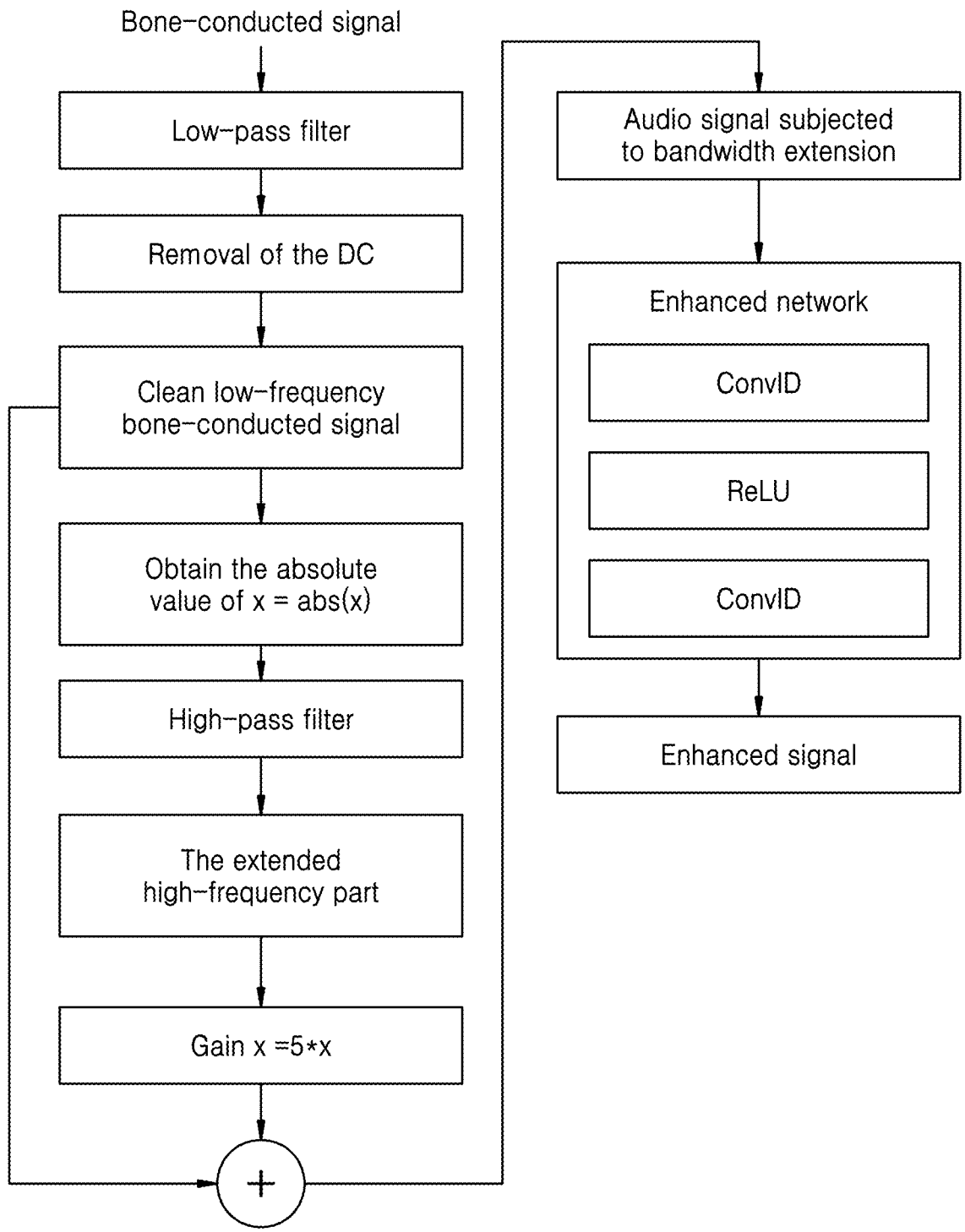
FIG. 6 is a schematic structure diagram of a signal enhanced network, according to an embodiment.

As an optional embodiment, FIG. 6 is a schematic diagram of a structure for implementing bandwidth extension and enhancement of an audio signal according to an embodiment of the present disclosure. The flow of processing the bone-conducted signal by this structure may include the following processes:

(1) Pre-Processing of the Signal

The original signal (e.g., the bone-conducted signal) needs to be pre-processed before bandwidth extension, and it is then extended and enhanced. Optionally, the pre-processing module may include two parts: a high-frequency noise suppression module (e.g., a low-pass filter) and a DC removal module.

The high-frequency noise suppression module is configured to filter the high-frequency noise from the original bone-conducted signal. The specific implementation of the high-frequency noise suppression module is not limited in the present disclosure. Optionally, as shown in FIG. 6, a low-pass filter may be used as the high-frequency noise suppression module to filter the high-frequency noise from the original bone-conducted signal.

Figure 7:
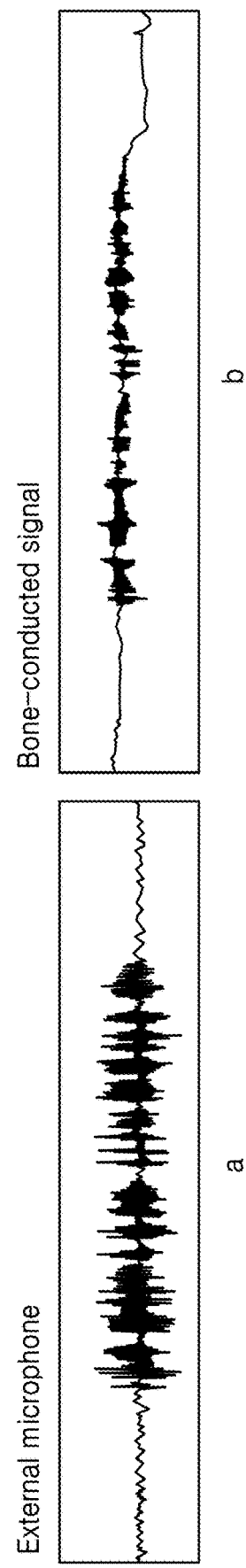
FIG. 7 is a schematic comparison diagram of waveforms of two audio signals, according to an embodiment.

Compared with the external microphone signal, there is a strong DC bias in the bone-conducted signal, as shown in FIG. 7. Drawings a and b in FIG. 7 show schematic comparison diagrams of waveforms of the bone-conducted signal and the external microphone signal. It may be found from the drawings that there is a strong DC bias in the bone-conducted signal, which may cause interference to the subsequent signal detection result. Consequently, an embodiment of the present disclosure includes a DC removal module. In FIG. 6, the DC removal module is configured to filter the DC bias from the audio signal. Similarly, the specific implementation of the DC removal module is not limited in the present disclosure.

Optionally, a high-pass filter may be used as the DC removal module to remove the DC bias from the bone-conducted signal, in order to avoid interference in the subsequent bandwidth extension part. Through the pre-processing, the high-frequency noise and DC bias characteristics in the original bone-conducted signal may be removed, and a clean low-frequency bone-conducted signal is obtained, which is used as the input signal for bandwidth extension.

An embodiment of the present disclosure further provides another optional DC removal solution, in which the DC bias in the original signal (e.g., the bone-conducted signal, which may be the bone-conducted signal processed by the high-frequency noise suppression module), may be removed by the moving average method. Specifically, the waveform signal of the bone-conducted signal is sampled. For each sampling point x, its moving average value x_avg may be obtained through the following Expression (1), and then the amplitude of this sampling point after removing the DC may be obtained by subtracting its corresponding moving average value from the sampling point (e.g., x=x−x_avg).

$$x\_avg = a1 \times x\_avg + a2 \times x \quad \text{[Expression 1]}$$

Referring to Expression (1), x represents the original amplitude of a sampling point, x_avg on the left side represents the moving average value corresponding to the sampling point x, which is the average value of the amplitude of the sampling point x and the amplitudes of sampling points prior to the sampling point in the time domain, x_avg on the right side represents the moving average value corresponding to a sampling point prior to the sampling point x, a1 and a2 are adjustment coefficients, which may be configured according to requirements (e.g., a1=0.95, a2=0.05).

(2) Bandwidth Extension

The bandwidth extension module is configured to use low frequency to fill in the missing high frequency information of the bone-conducted signal. The bandwidth extension module may be implemented by a related bandwidth extension technique, on the basis of the above pre-processing step.

Alternatively or additionally, the bandwidth extension module may fill in the missing high frequency information of the bone-conducted signal by performing the operations described below with reference to FIG. 6.

The input signal in this step is the clean low-frequency bone-conducted signal obtained in the step (1) (e.g., the pre-processing of the signal). As shown in FIG. 6, the bandwidth extension on the clean low-frequency bone-conducted signal may be processed by the following operations.

In an embodiment, a full-wave rectifier may be used to extend the bandwidth of a clean low-frequency bone-conducted signal to increase high-frequency information. For example, the absolute value of the waveform signal may be obtained (e.g., x=abs(x), where x represents the input signal, and abs(x) represents the absolute value of x).

A high-pass filter may be used to remove the low-frequency part of the signal subjected to the bandwidth extension. That is, only the extended high-frequency part reserved. Alternatively or additionally, the signal processed by the high-pass filter may be amplified (the gain processing in FIG. 6, by which the signal may be amplified to five (5) times the original value, for example) to obtain the amplified signal.

The extended high-frequency part (or the signal subjected to gain processing) may be added to the original low-frequency part of the pre-processed bone-conducted signal to generate the final bandwidth-extended signal.

In some embodiments, for the signal from which the DC bias has been removed, the bandwidth extension may also be implemented by means of snapshot replication (not shown), to extend the missing high-frequency signal of the bone-conducted signal. For example, the bone-conducted signal from which the DC bias has been removed may be subjected to time-domain sampling. For sampling points, a sampling point may be selected according to a preset interval (e.g., every other sampling point), and then the selected sampling point may be used to replace the adjacent unselected sampling points. For example, the original sequence obtained by sampling the bone-conducted signal may be expressed as 1, 2, 3, 4, 5, 6. Assuming that a sampling point is selected every other sampling point. For example, if the selected sampling points are 1, 3, and 5, after snapshot replication, the original sequence becomes 1, 1, 3, 3, 5, 5.

The bandwidth-extended bone-conducted signal obtained by any of the above bandwidth extension methods or by other bandwidth extension methods may be used as the input to the bone-conducted signal enhanced network.

(3) Enhanced Network

The enhanced network uses the bone-conducted signal for data enhancement, which is used to enhance the signal subjected to bandwidth extension, so that the obtained enhanced signal is as similar as possible to the normal signal collected by the external microphone.

Figure 8:
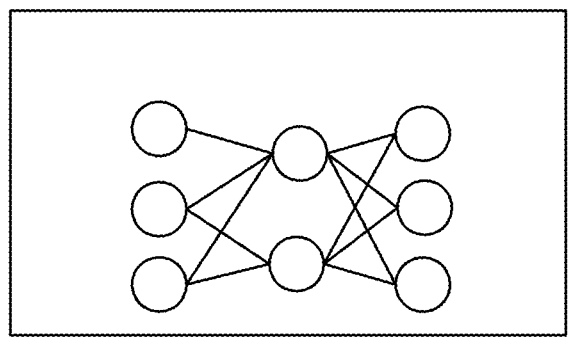
FIG. 8 is a schematic structure diagram of neurons of a signal enhanced network, according to an embodiment.

FIG. 6 is a schematic structure diagram of an enhanced network according to an embodiment of the present disclosure, and FIG. 8 is a schematic diagram of the connection between neural network elements of each layer of the network. As shown in FIG. 6 and FIG. 8, the enhanced network includes two 1D (1-dimensional) convolutional neural network (CNN) layers, that is, convolutional layers. An activation function layer (the activation function Relu layer in FIG. 6) is connected between the two convolutional layers. The input to the enhanced network is the bone-conducted signal subjected to bandwidth extension, and the output is a signal that, after being enhanced, is similar to the normal signal. The enhanced signal may be used for human body sound detection in the next step.

Part 2: Three-Branch Cascaded Detector

The bandwidth extension+enhanced network provided in an embodiment of the present disclosure and the design of the three-branch cascaded detection process this part cooperate with each other, in order to cover different frequency bands that may be of interest for different non-voice human body sounds. In an embodiment of the present disclosure, for different target frequency bands, three groups of features are designed in combination with the extension and enhancement method for the bone-conducted signal. Each group of features may be trained to obtain a low-complexity classification model. In an embodiment, non-voice signals are divided into three categories (e.g., three subtypes) and each model may achieve high accuracy in a certain category.

The outputs from the three models may be fused through a cascaded structure to obtain the final detection result.

Figure 5B:
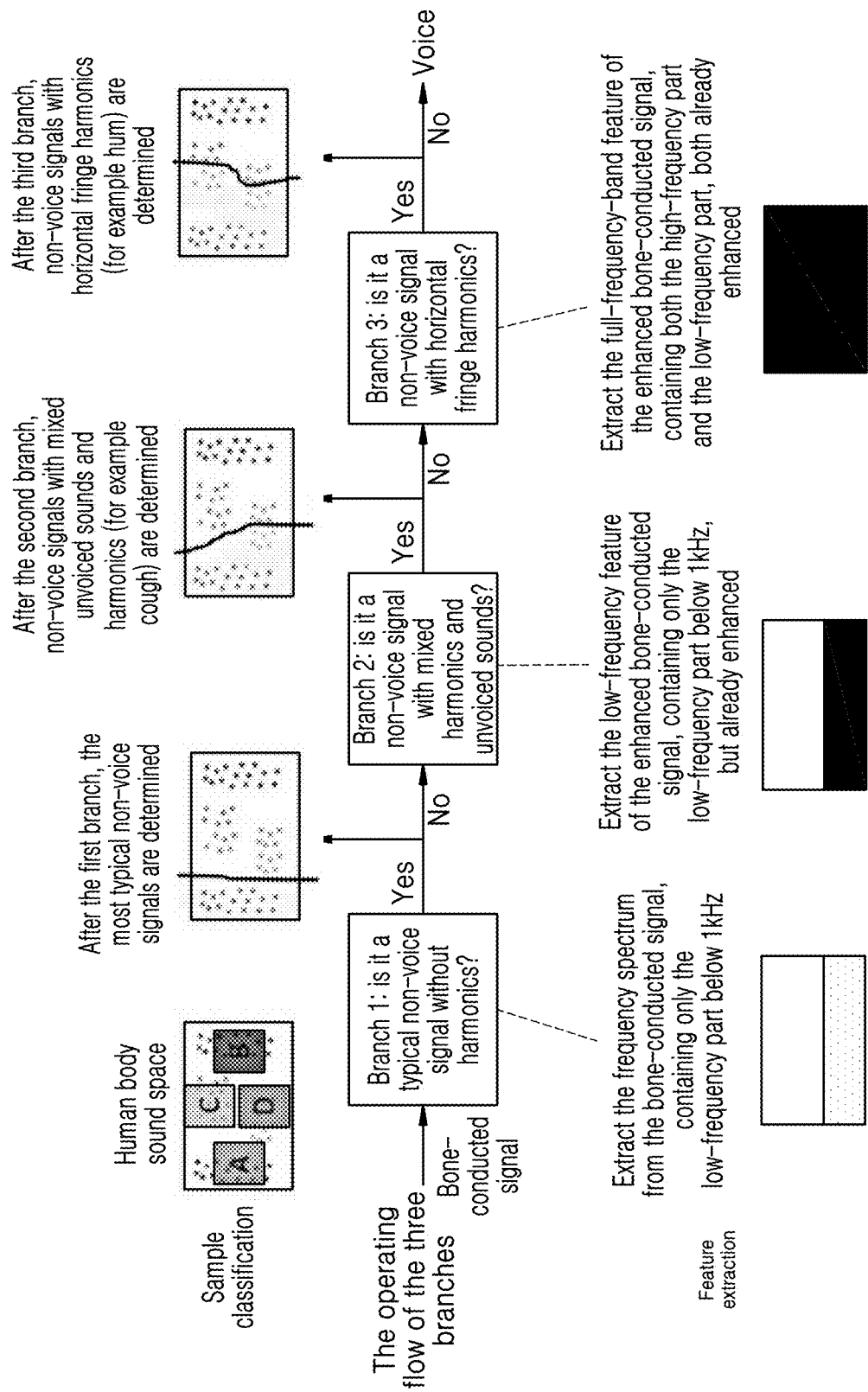
FIG. 5B is a schematic design diagram of a method executed by an electronic device, according to an embodiment.

FIG. 5B is a schematic design diagram of the audio signal processing method of FIG. 5A in the present disclosure. As shown in FIG. 5B, by clustering spectral features of sample audio signals of human body sounds from multiple different sources, these sample signals may be divided into four categories. That is, the spatial distribution of human body sounds as shown may include four categories of signals (e.g., A, B, C, and D). Samples in the category A may be human body sounds produced when the user is not in a conversation state (e.g., typical non-voice signals without harmonics). Samples in the category B may be expected voices produced when the user speaks in a conversation (e.g., typical voice samples). Samples in the category C and category D may be mixed voice and non-voice samples. The categories are further described below with reference to FIG. 15. The operating principles of the three branches of FIG. 5A are described below in conjunction with FIG. 5B and FIG. 6.

Branch 1 corresponds to Feature 1 and Model 1, which uses the original bone-conducted signal or the bone-conducted signal from which the DC bias has been filtered. This branch focuses on the low-frequency information, covering detection of non-voice human body sounds of categories such as touching, headshaking, hitting. Feature 1 is the input to Model 1. The Feature 1 is the input signal to the branch (e.g., audio features of the original bone-conducted signal or the bone-conducted signal from which the DC bias has been filtered). The audio features may include, but are not limited to, the spectral features of the signal. For example, the audio features may include one or more of features such as Mel-scale Frequency Cepstral Coefficients (MFCC), Mel spectrum, or linear spectrum of the input signal.

As shown in FIG. 5B, Branch 1 may extract spectral features from the original bone-conducted signal to be processed. The spectral features basically contain only low-frequency features below 1 kHz, by which it may be determined whether the bone-conducted signal is a typical non-voice signal without harmonics (e.g., whether it belongs to the category A (a subtype)). That is, typical non-voice signals may be distinguished through Branch 1.

Branch 2 corresponds to Feature 2 and Model 2, which uses the bone-conducted signal subjected to bandwidth extension and enhancement (e.g., a signal, such as the seventh audio signal) obtained by down-sampling this signal to a set frequency (e.g., 1 kHz). The processing deletes the high-frequency part of the enhanced signal, and only focuses on the enhanced low-frequency information. This branch may cover detection of the sound of coughing and similar non-voice human body sounds.

The specific implementation of deleting the high-frequency part of the enhanced signal is not limited in the present disclosure. Optionally, the enhanced signal may be down-sampled to 1 kHz by down-sampling, or the high-frequency part of the enhanced signal may be filtered by a low-pass filter.

Similarly, after obtaining the enhanced signal from which the high-frequency part has been filtered, the audio feature of the signal (e.g., the Feature 2) may be obtained, and the audio feature may be input into the classification Model 2 to detect whether the bone-conducted signal is a voice signal.

As shown in FIG. 5B, if the detection result from Branch 1 shows that the bone-conducted signal is not a typical non-voice signal, detection may be continued in Branch 2. In Branch 2, based on the features of the enhanced low-frequency part, it may be determined whether the bone-conducted signal is a non-voice signal that is a mixture of harmonics and unvoiced sounds. That is, it may be determined whether the bone-conducted signal is a non-voice signal of type D1 in the category D shown in FIG. 15 (e.g., a cough-like non-voice signal). Through Branch 2, non-voice signals of this type may be distinguished.

Branch 3 corresponds to Feature 3 and Model 3, which uses the bone-conducted signal subjected to bandwidth extension and enhancement (e.g., the enhanced signal obtained in FIG. 6). The enhanced signal used in this branch is not down-sampled, and this branch focuses on both the high-frequency information and the low-frequency information. This branch may cover detection of non-voice human body sounds similar to hum-like sounds. By inputting the audio feature of the enhanced signal in the full frequency domain (e.g., the Feature 3) into the Model 3, the detection result of the branch may be obtained.

As shown in FIG. 5B, if the detection results from Branch 1 and Branch 2 both show that the bone-conducted signal is not a typical non-voice signal, detection may be continued in Branch 3. In Branch 3, based on features of the low-frequency and high-frequency parts, it may be determined whether the bone-conducted signal is a non-voice signal with horizontal fringe harmonics. That is, it may be determined whether the bone-conducted signal is a non-voice signal of type C1 in the category C shown in FIG. 15. Through Branch 3, non-voice signals of this type may be distinguished. If the detection results from the three branches all show that the bone-conducted signal is not a non-voice signal, it may be determined that the bone-conducted signal is not a non-voice signal.

For example, when using the three branches for detection, Branch 1 may be used first for detection. That is, the audio features of the original bone-conducted signal (or the bone-conducted signal from which the DC bias has been filtered) are obtained, for example one or more spectral features, and the features are input into the well-trained Model 1 to obtain a detection result. If the detection result shows that the bone-conducted signal is a non-voice signal, the detection process may end. The final signal detection result shows that the bone-conducted signal is a non-voice signal. If it cannot be determined whether the bone-conducted signal is a non-voice signal based on the detection result from Branch 1, which means that it is a voice signal, the detection process of Branch 2 is executed. That is, the audio features of the enhanced signal from which the high-frequency part has been deleted are obtained, and the features are input into Model 2 to obtain a detection result. Similarly, if the detection result shows that the bone-conducted signal is a non-voice signal, the detection process may end. The final signal detection result shows that the bone-conducted signal is a non-voice signal. If it cannot be determined whether the bone-conducted signal is a non-voice signal based on the detection result from Branch 2, which means that it is a voice signal, the detection process of Branch 3 is executed. That is, the audio features of the enhanced signal in the full frequency domain are obtained, and the features are input into Model 3 to obtain a detection result of Branch 3. Then, the detection result from Branch 3 may be considered as the final signal detection result of the bone-conducted signal.

By the detection method provided in an embodiment of the present disclosure, the complexity of detection may be reduced while maintaining high accuracy for at least the following reasons.

First, by using the three-branch detection method, a complex large issue may be decomposed into three small issues, and the complexity of data processing required to achieve high accuracy for small issues may be greatly reduced.

As discussed above from the previous description, by clustering the spectral features of non-voice sample signals from more than 20 different sources, these non-voice audio signals may be divided into three categories. Based on the original categories of the three categories of sample signals, these non-voice signals may be classified into three categories: vibration, cough, and hum. By coarsely dividing the non-voice signals, a large issue may be decomposed into three small issues. In each coarsely-divided category, the spectrums of non-voice signals are similar, and among the categories, there is difference in features. Due to the intra-category similarity of the coarsely-divided categories, it may be achievable to distinguish non-voice signals from voice signals in a certain small category. For this small category, the required classification model is small, the accuracy that may be achieved is high, and the training complexity of the model may also be effectively reduced.

Second, since the frequency bands (spectral features) focused for the three small categories are different, three groups of features may be designed, which may further reduce the complexity of the model.

As described above, the detection of vibration-like non-voice signals, cough-like non-voice signals, and hum-like non-voice signals focuses on different frequency bands. Accordingly, features according to the respective frequency bands of the three categories of non-voice signals are designed in the solution of and embodiment of the present disclosure (hereinafter referred to as Feature A, Feature B, and Feature C). Corresponding classification models are trained with features for corresponding frequency bands, which may reduce the complexity of the model.

For example, for Feature A of Branch 1, the original bone-conducted signal is used, the effective frequency is usually below 1 kHz, almost no high-frequency information, and the energy of the low-frequency part is also low. Even though, it is enough to distinguish common vibration-like non-voice signals by using signals in the low-frequency part, such as, but not limited to, the body touching the device, fingernails hitting the device, friction caused by taking off the mask. Vibration-like non-voice signals and voice signals have a high degree of discrimination. Vibration-like non-voice signals have no obvious harmonics in the low-frequency part, which is different from voice signals. Therefore, voice signals and vibration-like non-voice signals may be effectively distinguished based on the low-frequency features of the original bone-conducted signal.

For Feature B of Branch 2, the enhanced signal obtained by subjecting the original bone-conducted signal to bandwidth extension and enhancement and then down-sampling to 1 kHz is used. For this signal, there is no high-frequency information, but the low-frequency part is enhanced. For non-voice signals such as sounds produced by people coughing or hawking, although there are aspirated sounds similar to vibration in the low-frequency part, such sounds may be distinguished from the voice signals in the low-frequency part after the low-frequency part is enhanced.

For Feature C of Branch 3, the enhanced signal in the full frequency domain is used, which contains both low-frequency information and high-frequency information. For example, the frequency domain of the signal may be extended to 8 kHz by subjecting the original bone-conducted signal to bandwidth extension and enhancement, and then the Mel spectrum is extracted. This feature is used as the input feature of Model 3. This process needs more computations when compared with the first two groups of features. However, for hum and similar non-voice signals for which it takes a certain period of time to capture the smooth features, by extending the high-frequency part, the smooth features are better emphasized and thus the discrimination between such non-voice signals and voice signals is increased.

Figure 9:
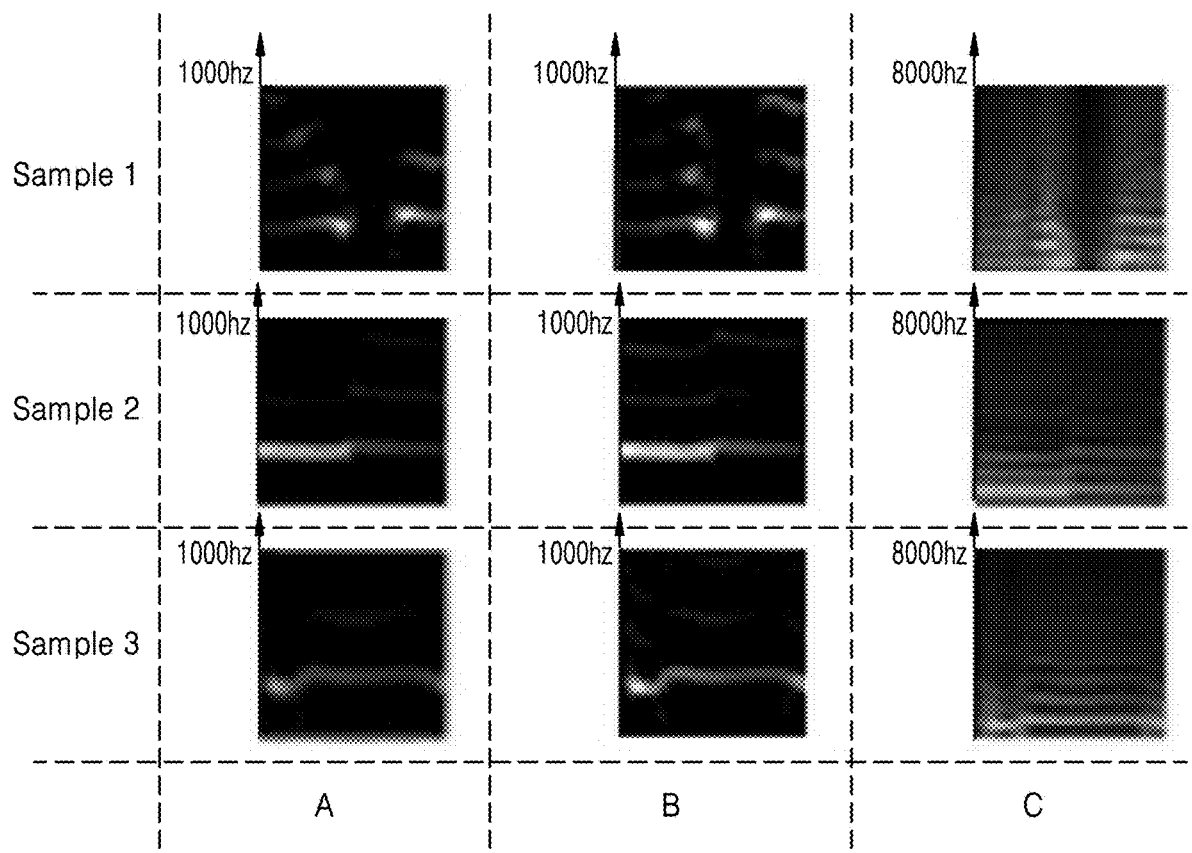
FIG. 9 is a schematic spectrum diagram of multiple audio signals, according to an embodiment.

As an example, FIG. 9 is a schematic comparison diagram of signals corresponding to the three different features. In this example, a total of three (3) sample signals are shown. The three horizontal schematic diagrams corresponding to each sample are, sequentially from left to right, schematic diagrams of the spectrums of the original bone-conducted signal (e.g., Feature A), the bone-conducted signal with the enhanced low-frequency part (e.g., Feature B), and the full-frequency-domain enhanced signal subjected to bandwidth extension and signal enhancement (e.g., Feature C). That is, the spectrum diagrams corresponding to the Feature A, Feature B, and Feature C of each sample. As shown, the original bone-conducted signal only has a low-frequency part. The energy of the low-frequency part may be enhanced by enhancing the low-frequency part, the frequency domain of the full-frequency-domain enhanced signal is extended, and both low-frequency and high-frequency parts are enhanced.

In addition, the effectiveness of an embodiment of the present disclosure may be verified based on the trend for the three detection tasks corresponding to the three branches to select the three groups of features. For example, a task of distinguishing non-voice signals from voice signals may be decomposed into tasks of respectively distinguishing non-voice signals of three categories from voice signals, and disassembled a complex task into three sub-tasks. That is, a complex task is decomposed into three subtasks. Testing may show that each subtask has different performance on the three groups of features. FIG. 10 is a schematic comparison diagram obtained by possible tests. As shown in FIG. 10, in the subtask of distinguishing voice signals from vibration-like non-voice signals, for Feature A, the original bone-conducted signal may work best, with an accuracy up to 94%. In the subtask of distinguishing voice signals from cough-like non-voice signals, for Feature B, the bone-conducted signal with the enhanced low-frequency part may work best, with an accuracy up to 99%. In the subtask of distinguishing voice signals from hum-like non-voice signals, for Feature C, the full-frequency-domain enhanced bone-conducted signal with the high-frequency information may work best, with an accuracy up to 94%.

Thus, by the signal detection method provided in the present disclosure, non-voice signals of different types may be more accurately and effectively distinguished from voice signals, when compared to related methods. For example, the provided method avoids the recognition of non-voice signals as voice signals. Furthermore, when implementing signal detection based on the classification models, by decomposing a complex detection task into multiple subtasks and using multiple models corresponding to different types of non-voice signals to implement the corresponding subtasks respectively, the model parameters of the models may be greatly reduced while ensuring the accuracy of the final detection result.

The three classification models, which are trained with the three groups of features, and which may be for example convolutional neural networks CNN for classification, may need a relatively small number of model parameters (e.g., approximately 6.7 k model parameters). For comparison, if not decomposing the task, in the case of using only the bone-conducted signal, a trained large model for distinguishing voice signals from non-voice signals may need approximately 2,427 k model parameters to obtain an accuracy of up to 91.1%. For another example, in the case of using only the external microphone signal, a model may need approximately 558 k model parameters to obtain an accuracy of up to 96.3%. From perspective of model parameters, by using the method of designing three groups of features and then decomposing a large issue into three small tasks provided in an embodiment of the present disclosure, the complexity of models may be reduced while ensuring the accuracy of the results, and the computations may be reduced as well.

Thus, by using the method provided in the present disclosure, a human body sound detection architecture with less computations, low complexity and low storage may be obtained. When applied to the detection of the bone-conducted signal, this architecture may use only the bone-conducted signal as the input. In this way, signal detection at this accuracy may be realized.

The specific training method for the classification models involved in optional implementations provided in an embodiment of the present disclosure is not limited in the present disclosure. Optionally, training may be performed based on sample signals with a label corresponding to each classification model. Taking Model 1, Model 2, and Model 3 shown in FIG. 5A as an example (Model 1 corresponds to the first classification model in the foregoing embodiment, and Model 2 and Model 3 correspond to the second classification model in the foregoing embodiment), optional training methods for models are described below. Optionally, the initial neural networks corresponding to Model 1, Model 2, and Model 3 may be a same neural network, for example a CNN for classification.

The training sample set corresponding to Model 1 may include a large number of first samples, and these samples include a large number of voice signals and vibration-like non-voice signals, wherein which signals are voice signals and which signals are non-voice signals are known. For example, the samples may include a label, and the label indicates whether a sample is a voice signal or a non-voice signal. The initial CNN may be iteratively trained directly based on these first samples (or signals obtained by pre-processing these samples as described above). That is, the audio features of these samples are used as the input to the CNN, to obtain the prediction results of these samples through the CNN. By repeatedly training the CNN until the preset conditions are met, a well-trained Model 1 is obtained. The training loss corresponding to Model 1 may represent the labels of these samples and the prediction results from the model. That is, the difference between a determination of whether a signal is a voice signal or a non-voice signal according to the output from the model and the sample label.

The training sample set corresponding to Model 2 may include a large number of second samples, and these samples include a large number of voice signals and cough-like non-voice signals. Similarly, these samples may be samples with a label. For these second samples, enhanced signals corresponding to the second samples may be obtained through the pre-processing, bandwidth extension and signal enhancement as described above. Then, the high-frequency part is removed from the enhanced signal corresponding to each sample, to obtain a low-frequency enhanced signal. The low-frequency enhanced signals corresponding to the second samples are used as the training samples for the initial CNN. That is, the audio features of these low-frequency enhanced signals are used as the input to the CNN, to obtain the prediction results of the second samples through the CNN. Similarly, by repeated training and update of model parameters, a well-trained Model 2 may be obtained.

The training sample set corresponding to Model 3 may include a large number of third samples, and these samples include a large number of voice signals and hum-like non-voice signals. Enhanced signals corresponding to the third samples may be obtained through the pre-processing, bandwidth extension and signal enhancement as described above. The audio features of these enhanced signals are used as the input to the CNN. By repeatedly training the CNN, a well-trained Model 3 may be obtained.

After the well-trained Model 1, Model 2 and Model 3 are obtained, and the audio signal processing flow shown in FIG. 5A may be used to detect the audio signal to be processed.

Figure 11:
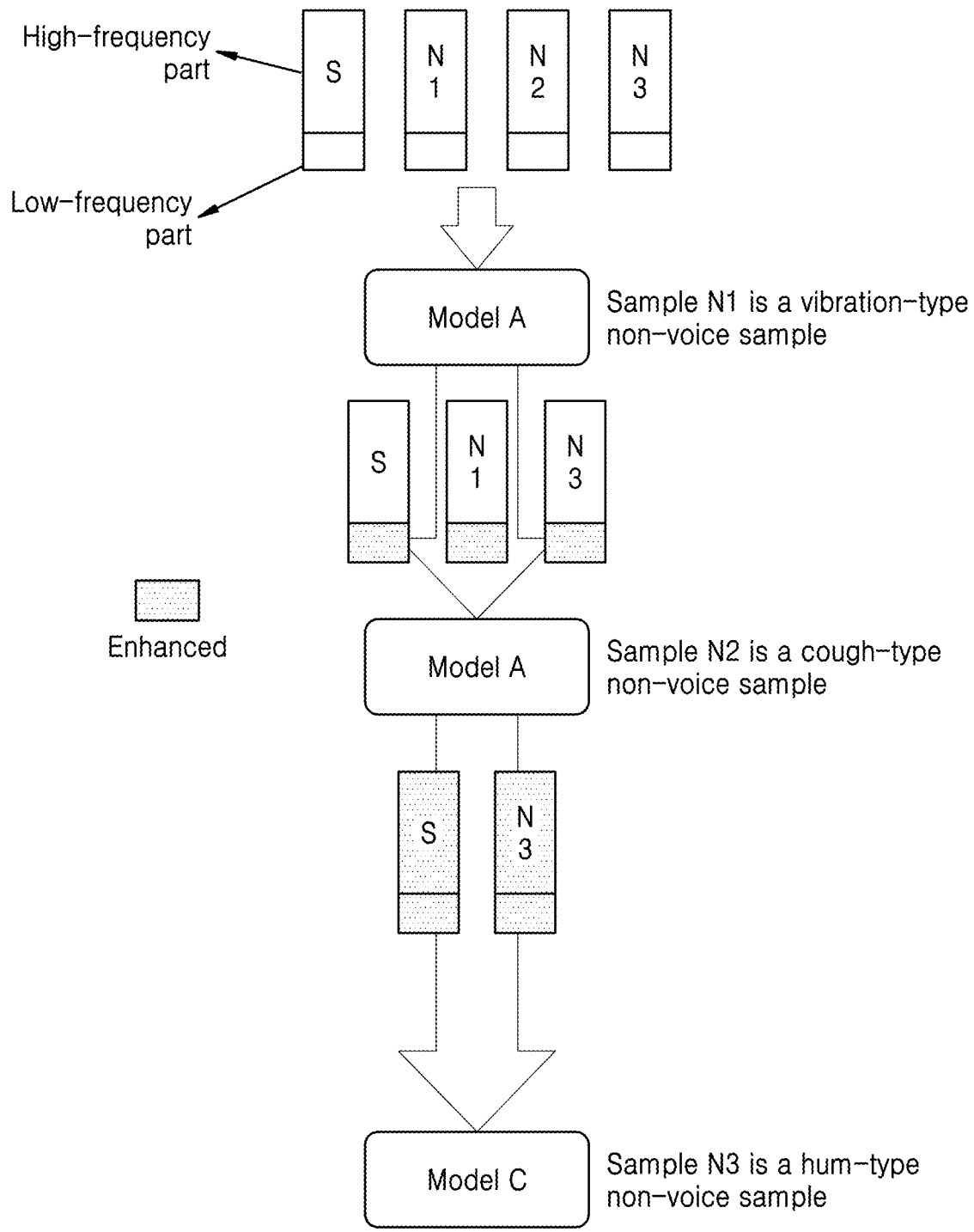
FIG. 11 is a schematic flowchart of a method executed by an electronic device, according to an embodiment.

As an example, FIG. 11 is a schematic diagram of the principle of using three well-trained classification models to detect multiple different sample audio signals, wherein Model A in the drawing is Model 1, Model B is Model 2, and Model C is Model 3. There are four samples in this example. S is a voice sample (e.g., a voice signal). N1 is a vibration-like sample (e.g., a vibration-like non-voice signal). N2 is a cough-like sample (e.g., a cough-like non-voice signal). N3 is a hum-like sample.

When detecting the sample N1, the Feature A of the sample N1 may be extracted (e.g., the audio feature of the sample signal). The Feature A may be input into Model A. The signal is detected as a non-voice signal by Model A, and the detection of the sample may end. The final signal detection result of this sample shows that it is a non-voice signal. As shown in FIG. 11, after the detection by Model A, the detection of the sample N1 has been completed.

When detecting the sample N2, the Feature A of the sample N2 may be extracted. The feature is input into Model A. The signal is detected by Model A as not a non-voice signal, and the next step is executed to subject the sample N2 to bandwidth extension and signal enhancement, to obtain a corresponding enhanced signal. The high-frequency part of the enhanced signal is removed to obtain an audio signal with its low-frequency part enhanced. The audio Feature B of the audio signal is extracted and then input into Model B. The detection result from Model B shows that the sample is a non-voice signal, and the detection of the sample N2 ends. The final signal detection result of this sample shows that it is a non-voice signal.

When detecting the sample N3, the audio Feature A of the sample N3 is extracted and then input into Model A. The signal is detected by Model A as not a non-voice signal, and the next step is executed to subject the sample N3 to signal processing to obtain an audio signal with its low-frequency part enhanced. The audio Feature B of the signal is input into Model B. The signal is detected by Model B as not a non-voice signal, and the next step is executed to input the audio Feature C of the full-frequency-domain enhanced signal of the sample N3 into Model C. The signal is detected by Model C as a non-voice signal. Finally, the detection results from the three models are fused to obtain the final detection result of the sample N3 showing that it is a non-voice signal.

When detecting the voice sample S, the Feature A of the sample S is extracted and then input into Model A. The signal is detected by Model A as not a non-voice signal, and the next step is executed to obtain a low-frequency-part enhanced signal corresponding to the sample S and extract and input the Feature B of the signal into Model B. The signal is detected by Model B as not a non-voice signal, and the next step is executed to obtain a full-frequency-domain enhanced signal corresponding to the sample S and extract and input the Feature C of the signal into Model C. The detection result from Model C shows that the sample S is not a non-voice signal. That is, the detection results from the three models all show that the sample S is not a non-voice signal. Thus, the final detection result of the sample S shows that it is a voice signal.

It may be understood from this example that, based on the original audio signal to be processed, by Model A, the detection of the vibration-like non-voice signals as voice signals may be avoided. If the original audio signal is a cough-like or hum-like non-voice signal, even if the signal is detected by Model A as a voice signal, it may be further determined by Model B whether the signal is a cough-like non-voice signal, and the detection of the cough-like non-voice signals as voice signals may be further avoided. If the original audio signal is neither a vibration-like non-voice signal nor a cough-like non-voice signal, even if the signal is detected by both Model A and Model B as a voice signal, the misjudgment may be further avoided through Model C. Thus, the accuracy of the final detection result may be improved when compared to related techniques.

Figure 12:
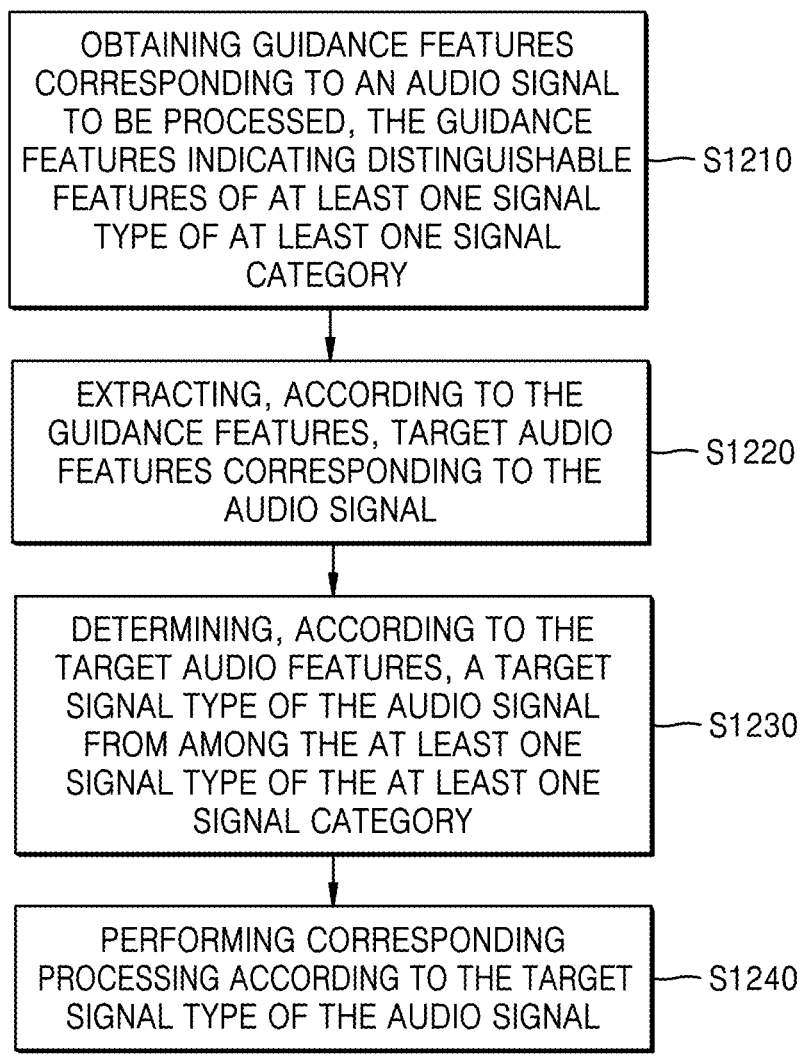
FIG. 12 is a schematic flowchart of a method executed by an electronic device, according to an embodiment.

FIG. 12 is a schematic flowchart of a method executed by an electronic device according to another embodiment of the present disclosure. As shown in FIG. 12, the method may include operations S1210, S1220, S1230 and S1240.

In operation S1210, the electronic device may obtain guidance features corresponding to an audio signal to be processed. The guidance features may correspond to distinguishable features between signal types of at least one category of signals. The guidance features may indicate distinguishable features of at least one signal type of at least one signal category.

In operation S1220, the electronic device may extract target audio features corresponding to the audio signal according to the guidance features.

In operation S1230, the electronic device may determine a target signal type of the audio signal from among the at least one signal type of the at least one signal category according to the target audio features.

In operation S1240, the electronic device may perform corresponding processing according to the target signal type of the audio signal.

Each category of signals may correspond to at least one signal type. Alternatively or additionally, each category of signals in the at least one category of signals may correspond to at least two signal types. That is, one category of signals may include signals of one or more types.

In practical applications, for different types of audio signals, in many cases, there may be multiple audio signals that belong to different types of audio signals, but the spectral features between these signals are very similar, and they may be classified into one signal category. As a result, when performing signal type detection, it is unable to determine with high accuracy which type these signals really belong to. For example, it may be difficult to distinguish the spectral features of the non-voice signal produced by an electric toothbrush and the voice signal of "Ah". These signals are both audio signals with smooth horizontal fringe harmonics on the spectrum. By clustering, it may be found that, although such similar signals belong to different signal types, they are likely to be clustered into one category. In view of this problem, related audio signal detection methods may not be able to achieve a good detection result.

However, by the method provided in the present disclosure, when detecting the type of an audio signal, guidance features corresponding to distinguishable features between signal types of at least one category of signals may be obtained, and based on the guidance information contained in the guidance features, target audio features with better feature discrimination may be extracted from the audio signal to be processed, so that the accuracy of signal detection may be effectively improved when compared to the related audio signal detection methods. For example, for the non-voice signal produced by an electric toothbrush and the voice signal of "Ah", the spectral features of the two audio signals are very similar and they may be classified into a category of signals. The guidance features may correspond to the distinguishable features of the two similar signals in this signal category. The guidance features may contain guidance information which may be used to guide how to extract more distinguishable target audio features.

The specific method for obtaining the guidance features is not limited in the present disclosure. For example, the guidance features may be the spectral features of the audio signal, or may be audio features extracted through a well-trained neural network.

Alternatively or additionally, guidance features corresponding to a audio signal may be extracted by a first encoder.

In an embodiment, extracting target audio features corresponding to the audio signal according to the guidance features may include extracting, by a second encoder, target audio features corresponding to the audio signal according to the guidance features.

The first encoder and the second encoder may be obtained by training a neural network based on sample audio signals. The network structure of the encoder is not limited in the present disclosure.

In an optional or additional embodiment, the extracting of the target audio features corresponding to the audio signal according to the guidance features may include extracting initial audio features corresponding to an audio signal, the initial audio features including a feature map corresponding to at least one channel, determining weight information corresponding to the initial audio features based on the guidance features, the weight information including at least one of first weight and second weight, wherein the first weight is channel weight and the second weight is spatial weight, and obtaining target audio features, by correcting the initial audio features by weights based on the weight information.

The method for extracting the initial audio features is not limited in the present disclosure. For example, any feature extraction network may be used, such as, but not limited to, a deep neural network.

In an optional or additional embodiment, the initial audio features corresponding to an audio signal may be obtained by extracting audio features of an audio signal corresponding to feature extraction networks, by at least two feature extraction networks with different convolution kernel sizes, and fusing audio features corresponding to feature extraction networks to obtain initial audio features.

The specific network architecture of the feature extraction network is not limited in the present disclosure, and may be configured according to design preferences and design constraints imposed on the overall system. For example, the feature extraction network may be a lightweight feature extraction network (e.g., a feature extraction network with a small scale of model parameters, such as, but not limited to, a shallow neural network).

In some embodiments, the convolution parameters of various feature extraction networks may be different. Feature extraction networks with different convolution kernel sizes may also be different in effect, which may pay attention (e.g., enhance) to the features of various dimensions (e.g., different spectral ranges) of the audio signal. By fusing multiple audio features extracted by different networks, initial audio features with better feature expression ability and implicit diversified information may be obtained. The way of fusing the audio features extracted by multiple feature extraction networks may include, but is not limited to, feature concatenation.

By using the method for extracting the initial audio features provided in the present disclosure, a lightweight neural network may be used to obtain shallow features to achieve high-accuracy signal detection. It may be understood that if the scale of the model parameters of the neural network is not considered, the initial audio features may also be extracted by using a deep neural network.

After the initial audio features are obtained, target audio features of the audio signal may be obtained based on the guidance features and the initial audio features. In some embodiments of the present disclosure a feature obtaining solution is discussed based on the attention mechanism. With this solution, the initial audio features corresponding to the audio signal may be corrected from the channel dimension and/or the spatial dimension based on the guidance features. Since the guidance feature contains feature extraction guidance information corresponding to the discrimination feature between different signal types, the corrected target audio feature contains more useful information for classification.

The first weight is a channel weight. The feature map of each channel may correspond to a respective weight. Among the feature maps of the channels, the feature map of a channel that is more useful for classification may be assigned a greater weight. The second weight is a spatial weight. The feature values of same position points in all feature maps correspond to a same weight, that is, the second weight may be a weight map. The size of the weight map may be equal to the size of the feature map. Correcting the second audio feature with the second weight may make more attention be paid to the feature values of the position points in the feature map that are more useful for classification. Therefore, the target audio features obtained by correcting the initial audio features by weights based on the weight information are features with better signal type discrimination.

Alternatively or additionally, the process of obtaining the weight information of the initial audio features according to the guidance features and obtaining the target audio features according to the weight information may be implemented by a neural network, by extracting initial audio features corresponding to an audio signal, and obtaining, by an attention network, the target audio features based on the guidance features and the initial audio features, wherein the attention network includes a channel attention network and/or a spatial attention network.

The channel attention network may be used to determine channel weights corresponding to the initial audio features, to obtain channel-weighted audio features. The spatial attention network may be used to determine spatial weights corresponding to the initial audio features, to obtain spatially-weighted audio features.

In an embodiment, the weight information may include a first weight and a second weight. For example, the channel weight is determined by the channel attention network based on the initial audio features and the guidance features. The initial audio features in the channel dimension are corrected by the channel weight to obtain the corrected features. Based on the corrected features and guidance features, the spatial weight is determined by the spatial attention network. Alternatively or additionally, the corrected features in the spatial dimension are corrected again by the spatial weight to obtain the target audio features.

When determining the weight information, the guidance features may be used to obtain a query in the attention mechanism, and the initial audio features may be used to determine a key and a value in the attention mechanism. For example, features may be extracted from the guidance features to obtain the query. Features may be extracted from the initial audio features by two different or same feature extraction layers to obtain the key and the value. Then, the weight information may be determined based on the correlation between the query and the key. The value is weighted by the weight information. The corrected features are obtained based on the weighted features.

For example, for the channel weight, the weight of the feature map of each channel in the value may be determined according to the query and the key. The feature map of a corresponding channel in the value is weighted by the weight of the channel to obtain the corrected features. Then, a new key and a new value may be obtained based on the corrected features. The query is obtained based on a guidance vector. Then, the weight map (e.g., the spatial weight) corresponding to the new value is determined according to the new key and the query. Each feature map in the new value is weighted separately by this weight map to obtain the target audio features.

In an embodiment, after obtaining the target audio features of the audio signal based on the guidance features, the obtained target audio features may be used as the input to the classifier, and the signal detection result of the audio signal may be obtained according to the output from the classifier (e.g., the target signal type to which the audio signal belongs).

In an optional or additional embodiment of the present disclosure, the method may further include determining the category detection result of the audio signal according to the guidance features, the category detection result indicating the possibility of the audio signal belonging to various signal categories including at least one signal of first category and at least one signal of second category, wherein the at least one category of signals refers to at least one signal of second category, one signal of first category corresponds to one signal type, and one signal of second category corresponds to at least two signal types, and if the category detection result indicates that the audio signal is a signal of first category, determining the signal type corresponding to the signal of first category as the target signal type of the audio signal, and the extracting target audio features corresponding to the audio signal according to the guidance features includes if the category detection result indicates that the audio signal is not a signal of first category, extracting target audio features corresponding to the audio signal according to the guidance features.

In an embodiment of the present disclosure, a detection method may combine coarse-grained detection and fine-grained detection. The coarse-grained detection may distinguish the category to which the signal belongs, that is, may obtain the category detection result. The fine-grained detection may be used to further determine, among multiple signal types corresponding to the second category, which signal type the signal belongs to, when it is unable to determine by the coarse-grained detection which signal type the signal belongs to. This two-step division method with different granularities may make the detection of audio signals less complex and highly effective.

In coarse-grained detection, the guidance features corresponding to the audio signal may be used as category distinguishing features, which may be used to determine the possibility that the audio signal belongs to each of multiple signal categories. That is, the possibility that the audio signal belongs to various signal categories. There are at least two categories of signals here, including at least one signal of first category and at least one signal of second category. The first category may be considered as a signal category that may be simple to identify, and one first category corresponds to only one type, for example, one subtype in a certain signal type. The second category may be considered as a signal category that is more complex to identify than the first category, and one second category corresponds to at least two signal types. That is, the second category may be a category containing signals of multiple different types.

Since the signal of first category is simple to identify and has good distinguishing features from signals of other categories, the audio signal may be coarsely classified according to the guidance features. If the category detection result of the coarse classification shows that the audio signal is a signal of first category, and the signal of first category corresponds to a signal type, then the target signal type to which the audio signal belongs may be determined. If the category detection result of the coarse classification shows that the audio signal does not belong to any first signal category, the target signal type of the audio signal cannot be determined, and further fine-grained detection is required. More distinguishable target audio features corresponding to the audio signal are extracted based on the guidance features. The signal type, among various signal types (signal types that are difficult to distinguish) corresponding to the at least one signal of second category, to which the audio signal belongs, is then further determined according to the target audio features.

In some embodiments, when extracting the target audio features corresponding to the audio signal according to the guidance features, the category detection result may also be used. That is, the target audio features corresponding to the audio signal may be extracted according to the guidance features and the category detection result.

In this case, the guidance features and the category detection result may be used as the guidance features to guide the encoder to extract more distinguishable target audio features. Even if the signal type of the audio signal cannot be determined based on the coarse-grained category detection result, the category detection result may indicate which signal type, among various signal types, the audio signal coarsely belongs to. Therefore, the category detection result also contains information related to the subsequent signal type discrimination and may be used as auxiliary information for fine-grained detection. With this solution, both the guidance features and the category detection result of the rough classification may be used as auxiliary information to guide the encoder to extract target audio features that are more conducive to classification. The final detection result is further improved.

In an embodiment of the present disclosure, there may be one or more signals of second category, among signals of various categories. Alternatively or additionally, each signal of second category may have a respective classifier (also referred to as classification layer). The determining the target signal type to which the audio signal belongs according to the target audio features may include determining a target classifier from classifiers corresponding to signals of second category, according to the category detection result, and determining, by the target classifier, a target signal type of the audio signal according to the target audio features.

The category detection result obtained by coarse-grained detection may reflect the possibility that the audio signal belongs to various signal categories. For example, the category detection result may be multiple probability values, and each probability value corresponds to a signal category among various signal categories. That is, the probability that the audio signal belongs to this signal category. Alternatively or additionally, the category detection result may also be a classification result containing two values of one (1) and zero (0). The signal category corresponding to one (1) is the category to which the audio signal belongs to, which is determined by the coarse-grained detection.

Thus, even if the signal type of the audio signal cannot be directly determined according to the category detection result obtained by the coarse-grained detection, which second signal category the audio signal should belong to may be known according to the category detection result. Considering the above factors, a corresponding classifier (classification layer) may be configured for each second category. When fine-grained detection is performed based on the target audio features, it may be determined according to the category detection result that which classifier corresponding to the second signal category is to be used, and the target classifier is then used to determine which signal type the audio signal belongs to, among signal types corresponding to the signal of second category.

Alternatively or additionally, the audio signal processing method of the present disclosure may further include performing signal processing on a audio signal to obtain a second audio signal, wherein the signal processing includes at least one of signal spreading, signal enhancement, and filtering the DC bias from the signal, wherein the guidance features corresponding to the audio signal are obtained based on a second audio signal, and/or the target audio features are extracted from a second audio signal based on the guidance features.

The obtaining of the second audio signal based on the audio signal is described above with reference to the foregoing embodiments, and, as such, the description is not be repeated here.

It may be understood that the optional embodiments of the method shown in FIG. 1 of the present disclosure and the optional embodiments of the method shown in FIG. 12 may be combined with each other if no conflict is present. Similarly, the audio signal to be processed may be a bone-conducted signal or other audio signals.

Similarly, the optional embodiments of the method shown in FIG. 12 of the present disclosure may be applied to classification applications of two or more types of signals, including, but not limited to, classification and detection of voice signals and non-voice signals as described above.

In related audio signal detection techniques, air-conducted signals may be used for detection. However, the use of air-conducted signals to detect the wearer's state may be interfered by external noise and equipment echo. The use of bone-conducted signals may effectively reduce this interference. However, compared with air-conducted signals, signal detection of bone-conducted signals may be more complex, because the propagation features of bone-conducted signals may cause the signals to lose high-frequency information, which reduces the discrimination of classification tasks and thus increases the difficulty of detection. Due to the principle of bone conduction, signals collected by a bone conduction device are highly similar, making it difficult to distinguish and detect the signals. As a result, related audio signal detection techniques may not be able to achieve high-accuracy detection of bone-conducted signals.

However, the methods provided by the present disclosure may perform human body sound detection with low complexity, high efficiency, and high accuracy even if only bone-conducted signals are used as the input. For example, these methods may be applied to user state detection on wearable devices to automatically control the device and/or to generate a state report for the user according to the detected state. The optional embodiments of the method provided in the present disclosure are described in more detail below while still using the classification and detection of voice signals and non-voice signals as an example. In the description of the following embodiments, the bone-conducted signal may be used as an example for the audio signal.

Figure 13:
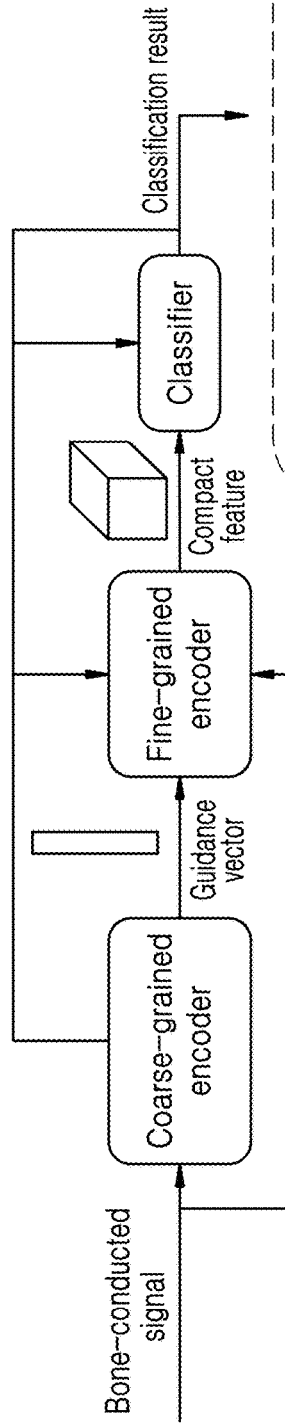
FIG. 13 shows the implementation principle of a method executed by an electronic device, according to an embodiment.

FIG. 13 is a schematic diagram of the frame structure of an audio signal processing solution provided according to an embodiment of the present disclosure. As shown in FIG. 13, the solution may include a coarse-grained encoder, a fine-grained encoder and a classifier. The coarse-grained encoder may perform coarse-grained detection. The fine-grained encoder and the classifier may perform fine-grained detection. For example, the coarse-grained encoder may use bone-conducted signals to generate guidance vectors (guidance features) and coarse-grained labels (category detection results), the fine-grained encoder may extract compact features (also called dense features or target audio features) from the bone-conducted signals according to the guidance information in the guidance vectors, and the classifier may predict which category a signal belongs to. That is, the classifier may predict whether it is a voice signal produced when the user is speaking (e.g., when the user is in a conversion state) or whether it is a non-voice signal produced when the user is not speaking (e.g., when the user is in a non-conversation state). Then, control of the wearable device may be determined based on the signal detection result.

In an embodiment, the detection solution shown in FIG. 13 may be realized by a neural network. That is, the audio signal processing may rely on network learning, instead of artificially set rules. The three modules (e.g., coarse-grained encoder, fine-grained encoder, and classifier) may form a whole, and may be trained together in an end-to-end manner during training, or may be trained separately. The operating principle of the above parts are described below.

Coarse-Grained Encoder

The coarse-grained encoder may use the bone-conducted signal collected by the wearable device as the input, to extract a guidance vector and a coarse-grained classification result (e.g., the category detection result, which may also be called a coarse-grained label). For example, four categories (e.g., the four signal categories as described above, such as A, B, C, and D) are obtained by coarse-grained classification. The samples of category B are expected voices produced when the user speaks in a conversation. Since the use of the bone-conducted signal only retains the low-frequency part, the spectral features of this category of audio signals are all harmonics and thus the samples are typical voice samples. The samples of category A are all human body sounds produced when the user is in a non-conversation state. Samples of category C and category D are not simply voice and/or non-voice samples, that is, category C and category D both correspond to two signal types. Samples of category C and category D may be coarsely divided into different categories because of the differences in the spectrum. If the input signal is output into these two categories by the coarse-grained encoder, it is not possible to determine whether or not the user is in the conversion state directly based on the result of this label. Further classification is needed, that is, fine-grained detection is needed.

In the above example, the samples of category A and category B may be regarded as samples that are easy (e.g., simple) to detect. The samples of category A and category B are the two signals of first category in the embodiment. In contrast, the samples of category C and category D may be regarded as samples that are difficult (e.g., complex) to detect. The samples of category A and category B are the two signals of second category in the embodiment.

The purpose of signal detection is to distinguish voice signals from non-voice signals. A coarse-grained encoder (also called a coarse-grained model) may be a lightweight model. For samples that are difficult to distinguish, since such samples contain voice and non-voice samples that are very similar to each other, it is difficult to directly distinguish voice and non-voice samples by the coarse-grained model and further fine-grained detection is needed.

The guidance vector extracted by the coarse-grained encoder describes which information in the input signal is helpful for the classification of voice and non-voice samples. The coarse-grained label contains the information of the coarse-grained category to which the current input signal belongs. This category is different from the final target to be detected and is not restricted by it. The category here may be obtained by clustering according to the similarity between the spectrums of the bone-conducted signals themselves. For example, clustering analysis may be performed on the spectrums of bone-conducted signals from multiple different sources, to obtain multiple coarse-grained categories (e.g., the above four categories A, B, C, and D). The coarse-grained label indicates the relationship between the input signal and these four categories (e.g., which category it belongs to).

Figure 14:
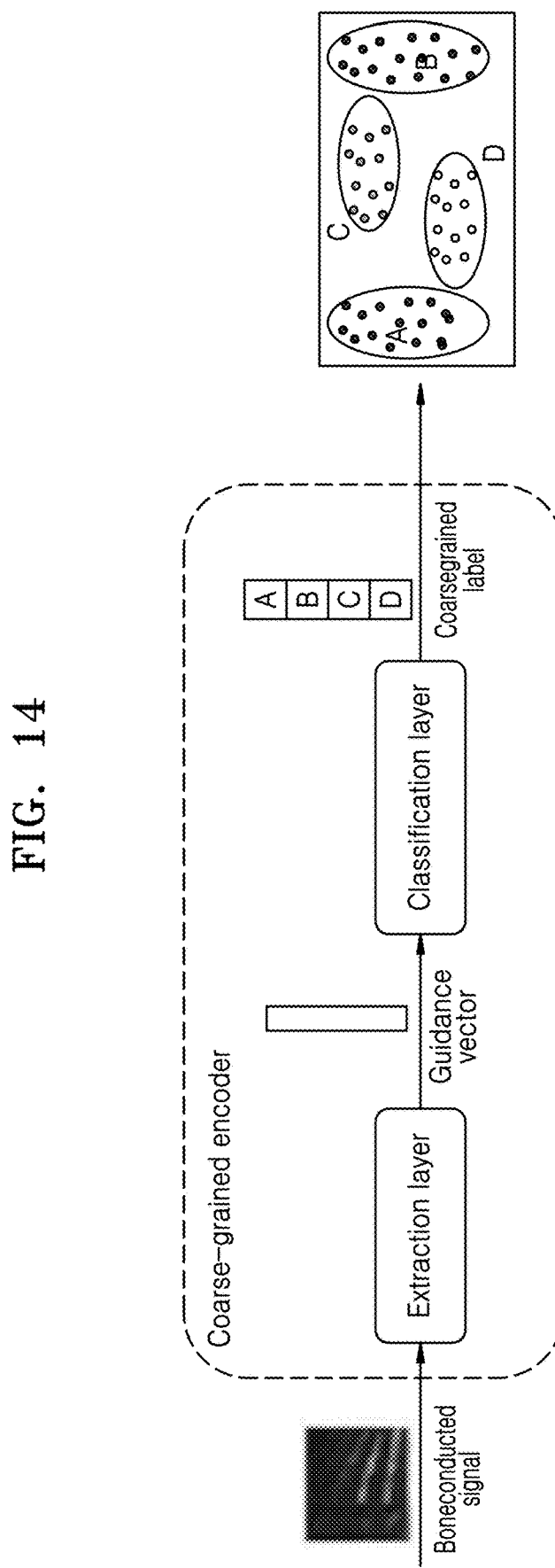
FIG. 14 is a schematic structure diagram of a coarse-grained encoder, according to an embodiment.

FIG. 14 is a schematic structure diagram of a coarse-grained encoder according to an embodiment of the present disclosure. As shown in FIG. 14, the coarse-grained encoder may include two parts: an extraction layer and a classification layer. The extraction layer converts the input bone-conducted signal into a guidance vector. Based on this guidance vector, the classification layer may generate a coarse-grained label. In the above example including categories A, B, C and D, as shown in FIG. 14, the coarse-grained label indicates which one of the four categories the input bone-conducted signal belongs to. Alternatively or additionally, the coarse-grained label may be a probability vector including four (4) probability values, and each probability value represents the probability that the bone-conducted signal belongs to one corresponding category.

It may be understood that the number of categories corresponding to the coarse-grained labels may be determined according to the similarity and discrimination of the spectrums of sample signals, which is related to the actual application needs and application scenarios. The coarse-grained labels may include examples of all categories A, B, C and D, which is just a possible solution. That is, the present disclosure is not limited in this regard. For example, the number of categories may be smaller than or greater than the four (4) without departing from the scope of the present disclosure.

Using the coarse classification of voice and non-voice samples into four categories as an example, FIG. 15 is a schematic comparison diagram of spectral features of sample signals of four coarsely-classed voice and non-voice categories, wherein the text is the description of features of signals of each category, below the text are schematic diagrams of the spectral features of the sample signals of the corresponding category. As shown in FIG. 15, category A is a typical non-voice category, composed of non-voice samples, no voice samples. The spectral features of samples of this category are easy to distinguish from those of voice samples, there is no periodic harmonic, and the energy is evenly distributed in the whole frequency band. Category B is a typical voice category. In the spectrums of bone-conducted signals, typical periodic harmonics generated due to vocal cord vibration may be observed (not shown). This feature may be used as a typical feature to distinguish category A. Samples of category C are samples of mechanical vibration sounds. Their spectrum contains horizontal fringes, and harmonics have smooth features in the timeline. Such sounds include both voice and non-voice samples, for example voice signal "Ah" (C2 voice signal in FIG. 15 is a voice signal of category C2) and vibration sound produced by an electric toothbrush (non-voice signal of category C1 in FIG. 15). Samples of category D are samples where harmonics and unvoiced sounds similar to white noise are mixed together. Both harmonics similar to voice features and spectrums similar to white noise with energy evenly distributed across frequency bands may be observed. Such sounds may also include both voice and non-voice samples, such as, but not limited to, the sound of coughing and voice containing wind noise in the background.

It may be understood from the example in FIG. 15 that the coarse-grained label may indicate which category the spectral features of an audio signal input to the coarse-grained encoder belongs to and contains the information of the coarse-grained category.

In an embodiment of the present disclosure, the coarse-grained classification may rely on the distribution features of the spectrum of the signal, rather than the label (signal type label) in the detection task. Therefore, even if it is unable to determine whether the input signal is the detection target from the coarse-grained classification result, the coarse-grained classification result may tell the fine-grained encoder which category this sample (the sample is a sample audio signal used for neural network training during the training process, and the sample is an audio signal to be detected when using the well-trained network for signal detection) coarsely belongs to according to the spectral features. The guidance vector contains guidance information, which may be used to guide the fine-grained encoder how to extract high-level information. That is, the guidance information indicates the kind of features the fine-grained encoder should focus on and extract, so that this fine-grained feature may be more helpful for the subsequent classifiers to classify such difficult samples.

Therefore, based on the guidance vector extracted by the coarse-grained encoder, when it is unable to clearly indicate whether the sample is the desired detection target according to the classification result from the coarse-grained encoder (e.g., when the coarse-grained detection result indicates that the signal to be detected belongs to category C or category D as mentioned above and it is thus impossible to determine whether the signal is a voice signal or a non-voice signal) both the guidance vector and the coarse-grained classification result may be input into the fine-grained encoder as detection guidance information for further feature extraction and classification. The guidance vector may indicate what features of the spectrum of the input signal the fine-grained encoder should focus on, and may be used to guide the fine-grained encoder to generate more compact features.

Using the above example where voice and non-voice samples are coarsely divided into four categories A, B, C, and D, FIG. 16 visually shows the significance of the guidance vector for fine-grained detection. As shown in FIG. 16, for signals of category C, the audio signals belonging to this category may be voice signals or non-voice signals, for example, the non-voice signal produced by the vibration of an electric toothbrush and the voice signal "Ah" produced when a person speaks. Comparing the trajectory of the first format of the signals, it is found that the sample produced by the vibration of the electric toothbrush is smoother in the timeline than the sample "Ah". The sample produced by the vibration of the electric toothbrush is basically smooth in the timeline, and the voice signal produced by "Ah" has slight fluctuations in the timeline. For signals of category C, the guidance vector may guide the fine-grained encoder to focus on the trajectory of the first formant in the spectrum of the signals. For signals of category D, the audio signals belonging to this category may be voice signals or non-voice signals, for example audio signals produced by coughing and audio signals produced when a person speaks in the wind. Comparing harmonics in the upper part of the spectrum of the voice and non-voice signals of category D, it is found that the sample produced by coughing has a short arc while the sample produced when a person speaks in the wind does not have any short arc. Therefore, this feature may be used to distinguish voice signals from non-voice signals. In this category, the guidance vector may guide the fine-grained encoder to focus on whether there is any short arc-shaped peak in the harmonics in the upper part of the spectrum of the signal.

In an embodiment of the present disclosure, the coarse-grained encoder may be implemented with a network with low complexity, because it relies on the most original similarity of the audio spectrum for signal classification. Since this similarity is based on shallow features, there is no need for a deep neural network. By a coarse-grained encoder, simple but common cases (e.g., the detection of signals of category A and category B) may be directly solved, which may save more computing resources to solve difficult cases, for example, to detect signals of category C and category D.

Fine-Grained Encoder

With the coarse classification result and the guidance vector provided by the coarse-grained encoder as auxiliary information, a lightweight model may be used as the fine-grained encoder to extract compact features (third audio features) from the input bone-conducted signal. This compact feature removes the redundant part of the original signal, and retains only the most useful information for distinguishing the detection target. This compact feature and the coarse classification result may be both input to the subsequent classifier. The coarse classification result may be used to determine a target classifier.

Figure 17:
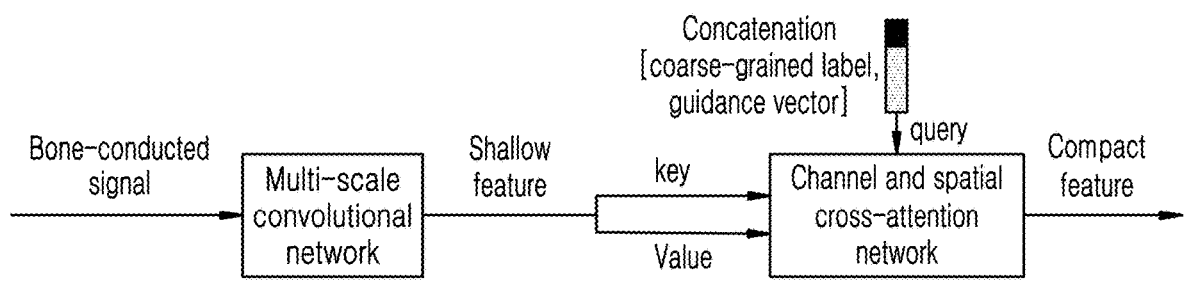
FIG. 17 is a schematic structure diagram of a fine-grained encoder, according to an embodiment.

FIG. 17 is a schematic structure diagram of a fine-grained encoder according to an embodiment of the present disclosure. The fine-grained encoder may be a feature extraction network based on the attention mechanism. Based on the guidance vector provided by coarse-grained encoder, the fine-grained encoder may focus on information in the bone-conducted signal that is more useful for classification, so as to extract a compact feature that is smaller in size and is more helpful for classification, that is, the target audio feature.

As shown in FIG. 17, the fine-grained encoder may include a multi-scale convolutional network (corresponding to at least two feature extraction networks in the foregoing) and a feature extraction network based on channel attention and spatial attention (channel and spatial cross-attention network). An introduction is given to the two feature extraction networks below.

Figure 18:
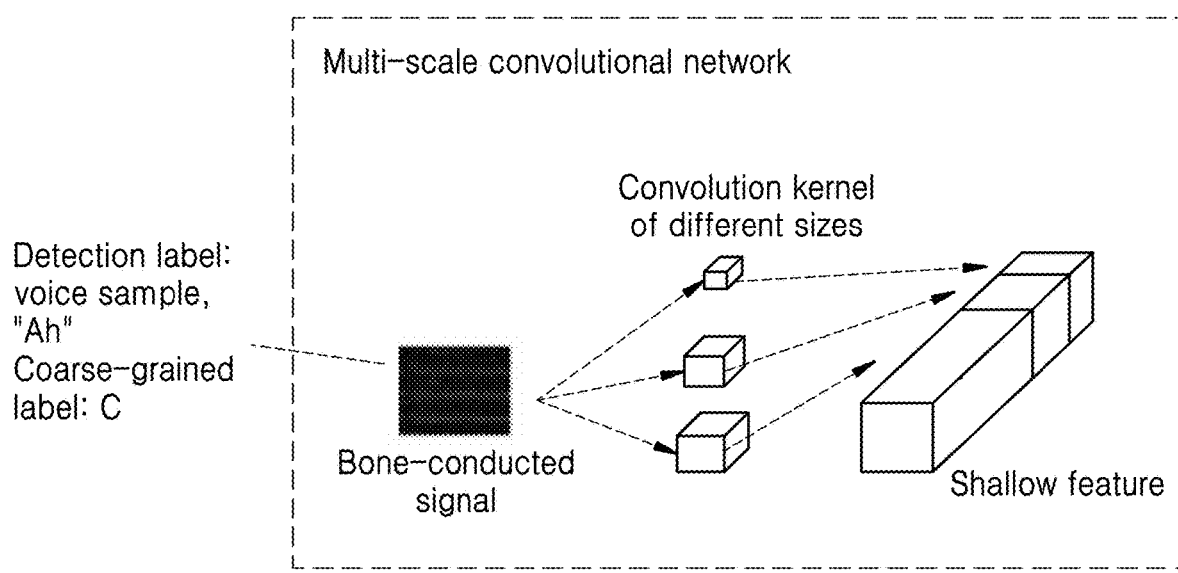
FIG. 18 is a schematic structure diagram of a multi-scale convolutional network, according to an embodiment.

FIG. 18 is a schematic structure diagram of a multi-scale convolutional network in an embodiment of the present disclosure. The convolutional network may be a lightweight neural network model. Multiple convolution kernels of different sizes may be used to convert the original bone-conducted signal into a shallow feature (initial audio feature). Alternatively or additionally, the shallow feature may be a feature obtained by concatenated features extracted by multiple convolutional networks using convolution kernels of different sizes. The fine-grained encoder may be trained by using sample audio signals with sample labels (detection labels and coarse-grained labels). The sample audio signals include voice sample signals and non-voice sample signals.

As shown in FIG. 18, for an audio sample "Ah" produced when a person speaks, the detection label shows the real signal type of the sample. That is, it shows that the sample belongs to the voice type. The coarse-grained label indicates which category the sample belongs to among the various categories corresponding to the sample. For example, the coarse-grained label of the voice sample "Ah" indicates the category C.

Figure 19:
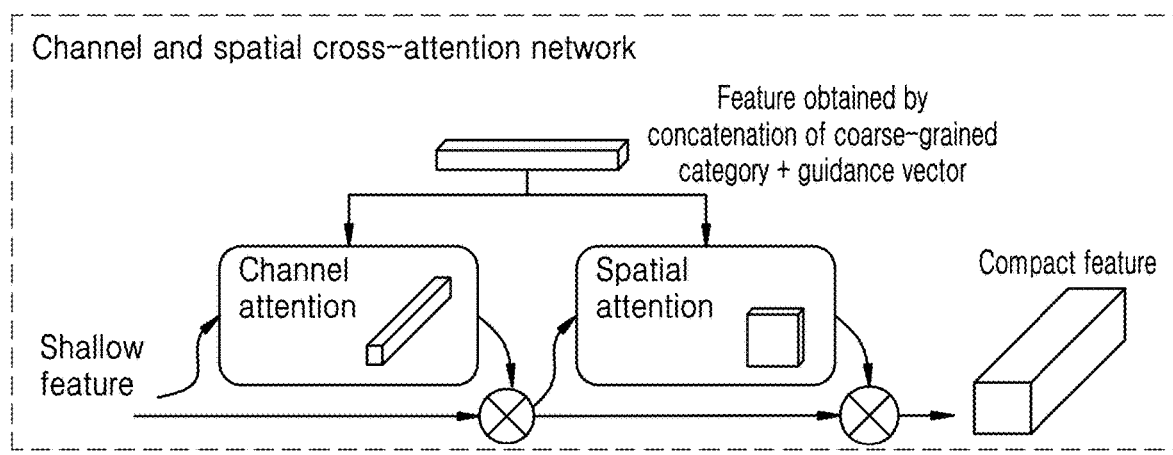
FIG. 19 is a schematic structure diagram of an attention network, according to an embodiment.

FIG. 19 shows a schematic structure diagram of an optional channel and spatial cross-attention network, which may be based on features (concatenated features) composed of guidance vectors and coarse-grained categories (e.g., coarse-grained labels), and the shallow features output by the multi-scale convolutional network, use the attention mechanism to calculate the attention weight, and multiply the weight with the shallow features output by the multi-scale convolutional network, the more useful part of the shallow features for classification may be assigned a larger weight and multiplied by the weight are output as compact features.

As shown in FIG. 17 and FIG. 19, the concatenated features of coarse-grained labels and guidance vectors may be used as the query of the attention network, and the shallow features may be used as the value and key of the attention network. Alternatively or additionally, the query may be obtained by feature extraction of concatenated features, and the key and the value are obtained by feature extraction by feature extraction of shallow features by different feature modules.

As shown in FIG. 19, the channel and spatial cross-attention network may include a channel attention mechanism and a spatial attention mechanism, wherein the channel attention mechanism may obtain the weight of the feature map of each channel in the shallow features. The spatial attention mechanism may obtain the weight of the feature value of each position point in the shallow features. Alternatively or additionally, the shallow features and concatenated features may be input into the channel attention network. The channel attention network may perform feature extraction on the concatenated features and shallow features respectively to obtain the query, key and value. Based on the query and key, the weight of 1×1×c may be obtained, where c is the number of channels in the shallow features. The weights of c channels may be weighted with the feature maps of the c channels in the value respectively. One input to the spatial attention network may be obtained based on the result of weighting, and the other input to the spatial attention network is the concatenated features.

The spatial attention network may perform feature extraction on the concatenated features and the weighted features output from the channel attention network respectively to obtain the query, key and value. Then, the key is pooled in the channel dimension to obtain a feature map of H×W×1, where H and W are the height and width of the feature map in the shallow features, and one (1) is the number of channels. According to the feature map and the query, a weight map of H×W×1 may be obtained. The weight map may be used to weight the feature value at each corresponding position point in the feature map of each channel in the value to obtain compact features. The compact features are the target audio features that are obtained by correcting the initial audio features by the detection guidance information in the channel dimension and the spatial dimension.

Figure 20:
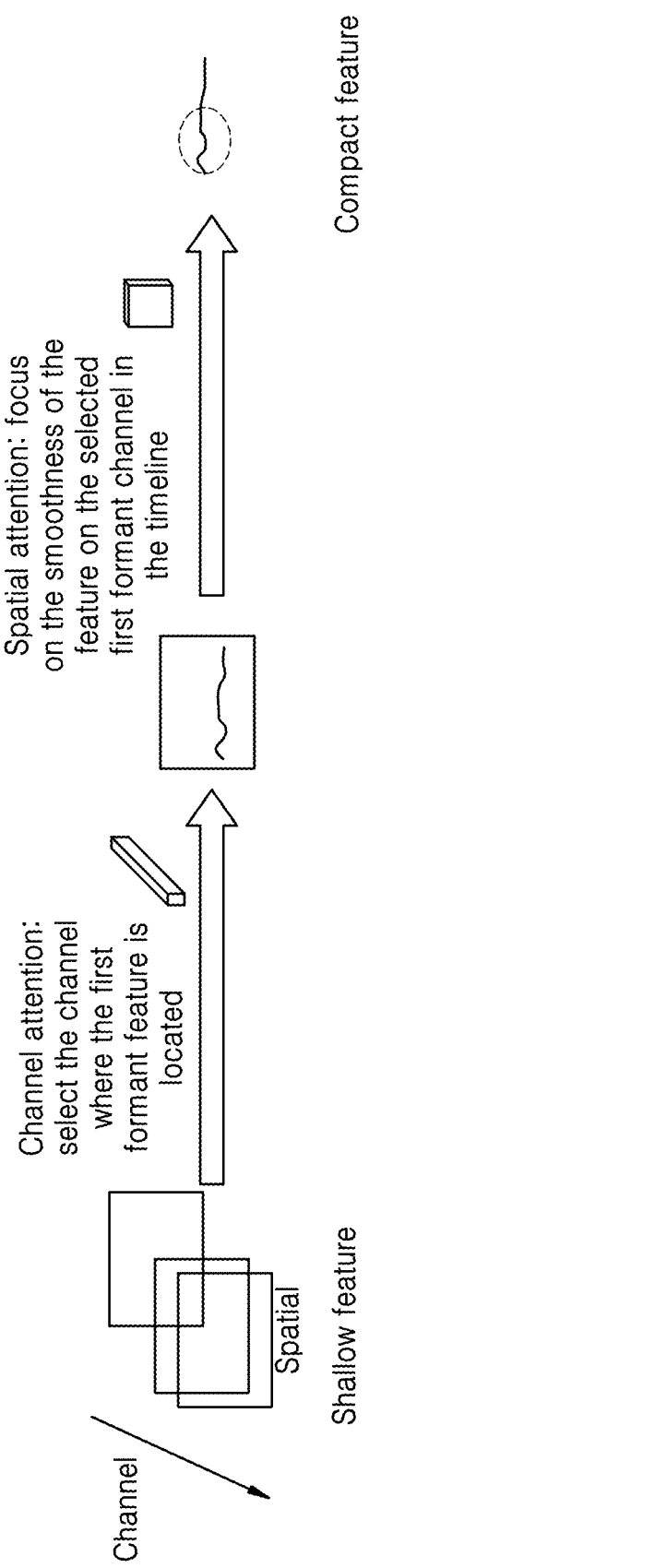
FIG. 20 and FIG. 21 show the principle diagram of a feature extraction solution, according to an embodiment.
Figure 21:
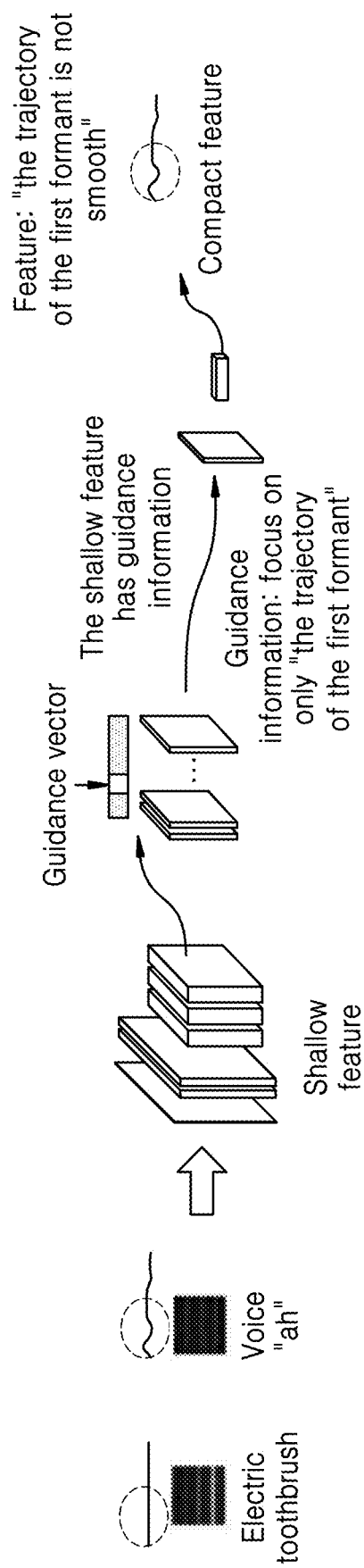

In an embodiment of the present disclosure, with the use of feature channel and spatial cross-attention, it is possible to select the most important feature type in the feature channel for distinguishing different types of signals, and at the same time pay attention to whether there is any subtle difference in the distribution of this feature in space. As an example, for the non-voice signal produced by the electric toothbrush and the voice signal "Ah" in the coarsely-classified signals of category C in the previous example, as shown in FIG. 20 and FIG. 21, corresponding shallow features may be extracted through a multi-scale convolutional network. The shallow features may include feature maps of multiple channels. Based on the guidance vectors, the channel attention network may select the channel where the first formant feature is located. The feature map of this channel may be given a greater weight. Based on the guidance vectors, through the spatial attention network, attention may be further paid to the smoothness of the features in the first formant channel in the timeline, to give a greater weight to the feature values at the position points in the feature maps that may be used to distinguish type C1 and type C2. As shown in FIG. 21, if the final compact feature shows that the trajectory of the first formant of the audio signal is not smooth but has slight fluctuations, then the audio signal may be accurately determined to be a non-voice signal of type C 1 according to this feature.

Based on the guidance vectors, the redundant information in the initial audio features may be removed, and the features related to the classification task may be enhanced. The compact features obtained in the above manner may reduce the complexity of the model and improve its performance. For the fine-grained detection process, there may be a subtle difference between voice signals and non-voice signals, which is only related to a few features or partial regions in the feature map. Considering that some guidance information has been obtained from the coarse-grained detection step, a compact feature extractor with guidance, which focuses on the information emphasized in the guidance information, may be designed for the fine-grained detection result. By indicating the features that need to be focused on in the shallow features by the guidance vectors, the redundant information may be quickly deleted. In this way, by a lightweight feature extraction network (e.g., a few layers of convolutional networks), it is possible to extract advanced information that usually exists only in the deep features.

That is, in the feature extraction solution by using the fine-grained encoder provided in an embodiment of the present disclosure, compact features with good discrimination may be obtained by a lightweight network instead of a deep network with high computational complexity. This is because the shallow features and the guidance information may be input into the fine-grained encoder together, to encode features that need to be focused on to directly focus on the guidance information. By removing redundant information, under a small number of network parameters and computations, the discrimination of the features that may be obtained by the deep network may be achieved. Therefore, the features generated by the fine-grained encoder with the assistance of guidance information may be called compact features.

The compactness here may be explained in two aspects. First, the redundant information irrelevant to the classification is removed from the spectrum of the signal, and only the features that may be used to distinguish different types of samples are extracted, which makes the classification simpler. Compactness may refer to the extracted features containing only the most useful information for the classification task, without redundancy. Second, the extraction of this feature may be implemented through two lightweight models, among which the lightweight coarse-grained encoder may be used to directly classify some samples that are easy to distinguish and also generate guidance vectors to guide the fine-grained encoder to purposefully pay attention to the features that may improve the discrimination of samples in the process of feature extraction, in order to find out the deep effective information with low computation cost and complexity to determine samples that are difficult to distinguish (e.g., non-voice samples and voice samples that are difficult to distinguish in the low-frequency region). Here, compactness may refer to the low complexity of the model, so that the effect of the deep neural network may be achieved with only a small number of parameters and a small amount of computations.

After the discriminative compact features are extracted by the fine-grained encoder, the features are input into the classifier, and the final signal detection result may be obtained according to the output from the classifier.

Classifier

There are two inputs to the classifier, one is the coarse classification result output from the coarse-grained encoder, and the other is the compact features output from the fine-grained encoder. The rough classification result may prompt the classifier to enter different branches (to determine the target classifier), for example, the branches corresponding to category C and category D in the above example. According to different branches (one branch corresponds to a classifier of the second category), the classifier classifies the compact features into a detection target to which the sample belongs. That is, the final classification result may be the target signal type of the audio signal to be processed.

Figure 22:
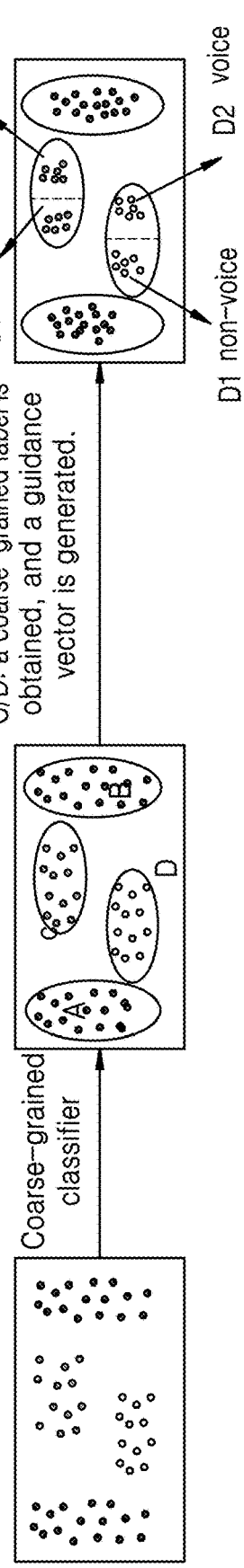
FIG. 22 shows the principle diagram of a signal processing method combining coarse-grained detection and fine-grained detection, according to an embodiment.

Using the previous example where voice signals and non-voice signals are coarsely divided into four categories: A, B, C, and D, FIG. 22 shows the principle diagram of the audio signal processing method combining coarse-grained detection and fine-grained detection in an embodiment of the present disclosure. As shown in FIG. 22, according to the original spectral features of human body sound samples from various sources in the application scenario, a large number of samples may be clustered into the above four rough categories (e.g., A, B, C, and D). When detecting the audio signal to be detected, a coarse-grained encoder may be used for coarse-grained detection. For example, the spectral features of the audio signal to be detected or features obtained by subjecting the spectral features to further feature extraction may be used as guidance features. Based on the guidance features, coarse-grained detection may be performed through the classification layer of the coarse-grained encoder (coarse-grained classifier in the drawing), to generate a coarse-grained label of the signal. That is, the coarse-grained encoder may coarsely classify the input signal according to the spectral features, to give this signal one of the four labels A, B, C, and D or to output the probability that this signal belongs to the four labels. If the result of the coarse classification shows that this signal belongs to category A or B, a classification result indicating whether the audio signal to be detect is a voice signal or a non-voice signal may be directly obtained. That is, when the classification layer of the coarse-grained encoder determines that the input signal belongs to one of categories A and B, it is able to directly determine whether the audio signal to be detected is a voice signal or a non-voice signal.

When the classification layer of the coarse-grained encoder determines that the input signal belongs to category C or D, further classification may be performed by a fine-grained classifier. The guidance vectors and the coarse-grained labels may be provided to the fine-grained encoder, to guide the fine-grained encoder to make features of voice and non-voice samples in categories C and D more distinguishable. That is, the coarse-grained labels and the guidance vectors may roughly show the fine-grained encoder what the spectral features of this sample are, for example, smooth horizontal fringe harmonics for category C and a mixture of harmonics and unvoiced sounds for category D, and may also show the fine-grained encoder which information should be extracted from the spectrum of the bone-conducted signal to output more compact and more discriminative features, in order to increase the discrimination between voice samples and non-voice samples in category C or D, so that subsequent classifiers may more easily distinguish them. Because of the coarse-grained labels and guidance vectors used as prompt information for input guidance, the fine-grained encoder may be designed as a lightweight model when it is used to distinguish samples of category C or category D that are difficult to distinguish. The complexity of the model itself is reduced. As shown in FIG. 22, fine-grained detection may be further used to determine whether the input signal is a non-voice signal of type C1 or a voice signal of type C2 in category C, or whether the input signal is a non-voice signal of type D1 or a voice signal of type D2 in category D.

Figure 23:
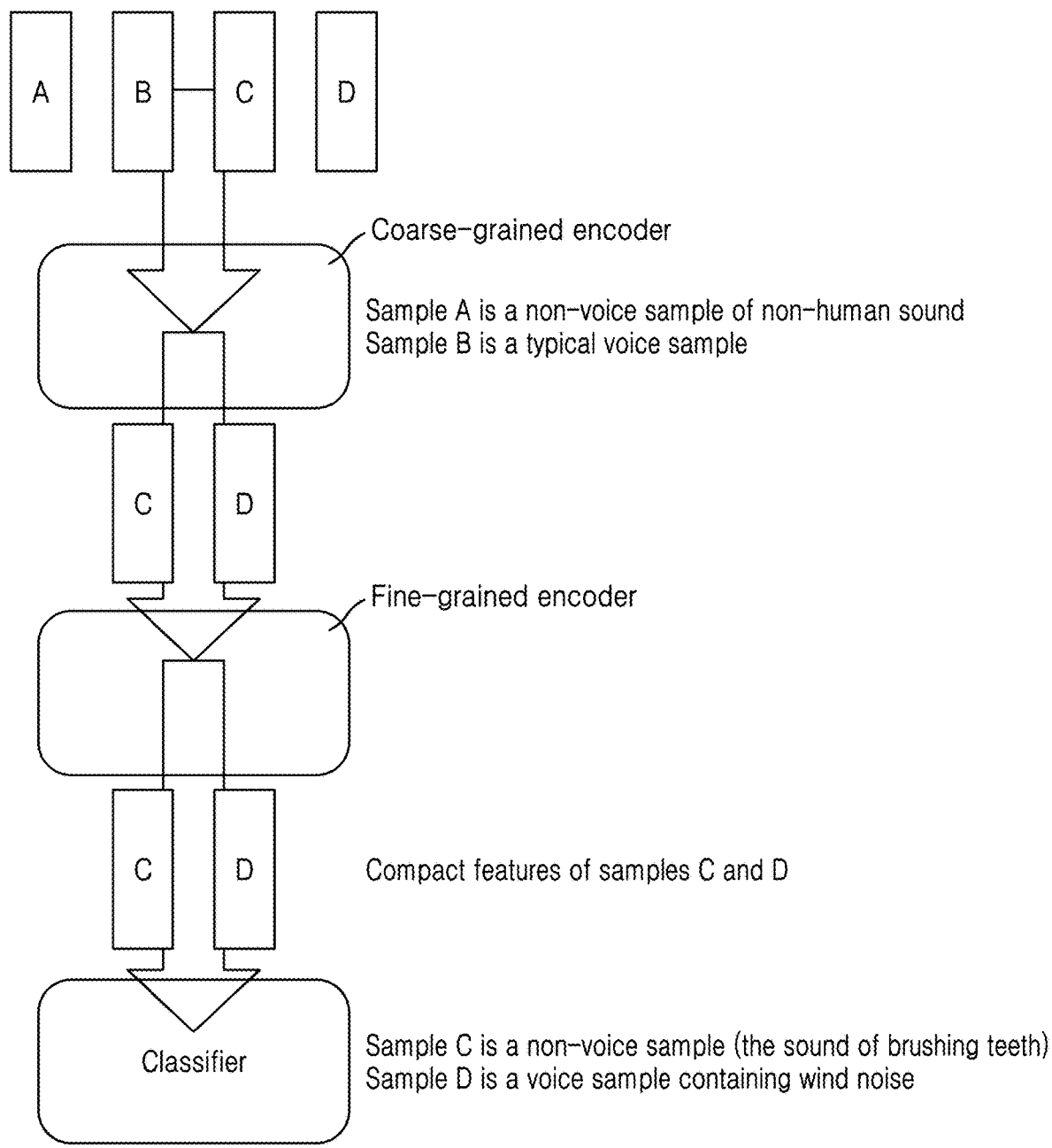
FIG. 23 shows the principle diagram of a method executed by an electronic device, according to an embodiment.

In the example shown in FIG. 23, there are four samples. Sample A is a typical non-voice sample of non-human sound, sample B is a typical voice sample, sample C is the sound of brushing teeth, and sample D is a voice sample containing wind noise.

For sample A, it is easy to distinguish and thus it is directly determined as a non-voice sample after being input to the coarse-grained encoder. Sample B is a typical voice sample, which is also easy to distinguish, and it is directly determined as a voice sample after being input to the coarse-grained encoder.

Sample C is the sound of brushing teeth, belonging to the mechanical vibration sound category, containing horizontal fringes in its spectrum. For this category, it is unable to determine by the coarse-grained encoder whether it is a voice sample or a non-voice sample. It is necessary to put sample C into the fine-grained encoder. The fine-grained encoder extracts the compact features of sample C, and the classifier determines that sample C is a non-voice signal based on the features. Sample D is a voice sample containing wind noise. This sample is a mixture of human sound and non-human sound. For this category, it is unable to determine by the coarse-grained encoder whether it is a voice sample or a non-voice sample. It is necessary to put sample D into the fine-grained encoder. The fine-grained encoder extracts the compact features of sample D, and the classifier determines that sample D is a voice signal based on the features.

The detection target result directly obtained by the coarse-grained encoder or the detection target result obtained by the fine-grained encoder and the classifier may be both applied to specific downstream tasks according to the application needs. Alternatively or additionally, in the downstream tasks, the detection result may be used to determine the user state, so as to control the intelligent device or generate a report.

In the downstream application scenarios in the intelligent control device as shown in FIG. 13, the state of the electronic device may be controlled according to the detection result of the audio signal, or the user state may be determined according to the detection result, and then the device may be controlled accordingly according to the user state. For example, when the signal detection is to determine whether the wearer of the Bluetooth headset is talking to someone, the human body sounds may be classified into two categories: voice signals and non-voice signals. Correspondingly, the wearer states are divided into talking and non-talking. As shown in FIG. 13, in scenarios where the user opens his mouth to say "Ah", speaks quickly or speaks in a low voice, when the signal detection result obtained based on the collected bone-conducted signal shows that it is a voice signal, it may be determined that the wearer is talking. In this case, the control to the headset may be to stop playing music or turning off the active noise reduction mode, so that the wearer may talk to the outside world without taking off the headset. For another example, when the user is coughing, brushing teeth, humming or eating, the signal detection result obtained based on the collected bone-conducted signal shows that it is a non-voice signal, so the wearer is not talking. In this case, the control to the headset may be to keep the music playing or turning the active noise reduction mode on, so that the wearer may continue to listen to the music.

In an embodiment of the present disclosure, a complete audio signal detection solution may be provided, which may include the process of classifying the input signal and performing post-processing on the classification result. Alternatively or additionally, when processing the audio signal to be detected in real time, since the audio signal includes multiple frames of signals, the audio signal to be detected may be divided into frames first, and then the frames of signals are subjected to category detection to obtain the classification results (signal detection results) of each frame. By summarizing the classification results of the frames and then smoothing, the final processing result of the audio signal may be obtained, which is then used in the downstream detection tasks.

It should be noted that, in some of the previous embodiments of the present disclosure, the detection tasks have been to distinguish voice signals and non-voice signals. Further, it may be determined according to the classification result whether the wearer of the device is talking, so as to control the device for downstream tasks. However, the present disclosure may distinguish more than two types, to deal with various downstream tasks of detecting and tracking the wearer's state based on the classification result of human body sounds. For example, in an embodiment of the present disclosure, the reduced discrimination of bone-conducted signal samples may be avoided in cases where classification models with high complexity cannot be used when the complexity of the solution is limited to a wearable device. That is, even with limited computing resources, signal classification with high efficiency and high accuracy may be achieved.

In some embodiments, where the original bone-conducted signal is used for signal processing, the DC bias in the signal may be filtered first, and the bone-conducted signal may be pre-processed by means of signal enhancement or signal frequency band extension. The signal enhancement may include at least one of traditional signal enhancement and neural network enhancement.

In an embodiment of the present disclosure, various non-voice signals and voice signals (including but not limited to the voice and non-voice signals shown in FIG. 2) may be accurately detected, and the implementation complexity of the solution may be low, when compared to related audio signal processing techniques. That is, the present disclosure provides multiple ways to meet the audio signal detection requirements in various scenarios, and realize accurate recognition of different non-voice signals and voice signals that may be generated in different scenarios. For example, embodiments of the present disclosure may achieve high-accuracy detection of voice signals and non-voice signals, with low complexity, without using external microphone data, and may achieve good generalization performance, when compared to related audio signal processing techniques.

The audio signal processing methods provided by the present disclosure may be compared with related audio signal processing techniques with respect to two dimensions. One dimension is the signal used for detection, including two methods with the use of external microphone signals and the use of only bone-conducted signals instead of external microphone signals. The other dimension is the detection method, including traditional signal processing methods, CNN small model detection methods, CNN large model detection methods, and the detection methods of the embodiments of the present disclosure. For the evaluation standard, two pieces of data are compared. One is the accuracy, and the other is the complexity of the detection method. The complexity of the detection method based on the neural network is described by the number of model parameters. The complexity of the related signal processing techniques may be relatively low. However, the accuracy of the related signal processing techniques may be too low to meet design constraints imposed on the overall system. When only bone-conducted signal is used as input for detection, with little difference in the data volume of the model parameters of the model, the accuracy of the embodiments of the present disclosure may be higher than that of the related signal processing techniques, and, with little difference in the accuracy, the complexity of the embodiments provided in the present disclosure may be significantly reduced. In addition, the data volume of the model parameters may be significantly smaller.

An embodiment of the present disclosure provides a method executed by an electronic device that includes obtaining an audio signal to be processed, which is collected by an audio collection device, determining signal detection results of the audio signal to be processed based on the audio signal to be processed, wherein the audio signal to be processed includes at least one frame of audio signal, the signal detection results include a target signal type of each audio signal, and the target signal type of one frame of audio signal is determined by the method provided in an embodiment of the present disclosure, and performing corresponding processing according to the signal detection result.

The audio signal to be processed may include multiple frames of signals. After the audio signal to be processed is obtained, the audio signal may be divided into multiple frames, to obtain various frames of signals. The frames of signals or some of these frames of signals may be detected respectively (e.g., some frames of signals may be selected from various frames of signals and only these selected frames of signals are detected) to obtain the detection result of each frame of signals (e.g., the target signal type). Based on the detection results of these frames, the signal detection result of the audio signal to be detected may be obtained. For example, the signal detection result may be obtained by summarizing the detection results of the frames.

In some embodiments, the electronic device may include an audio collection device. Alternatively or additionally, the electronic device may be a wearable electronic device.

In some embodiments, performing corresponding processing according to the signal detection result may include at least one of determining user state based on the signal detection result, determining the user's current environment according to the signal detection result, and controlling an electronic device based on the signal detection result.

It may be understood that, for different application requirements, different processing may be performed according to the signal detection result. Alternatively or additionally, the user state may be determined according to the signal detection result. The user state may include, but not limited to, talking, sleeping, the health state of the user (a health report may be generated) or the action state of the user (e.g., if the sound of a massage chair is detected, it may be determined that the user is using the massage chair; and if a signal is detected as the sound of brushing teeth, it may be determined that the user is brushing his teeth).

The user's current environment may be further determined according to the signal detection result, for example, whether the user is in an environment with high noise. The electronic device of the user may be controlled automatically according to the detection result. For example, if it is detected that the user is talking while he is listening to music, the volume of the music may be turned down or stopped.

When automatically controlling the electronic device based on the signal detection result, the methods provided by the present disclosure may be executed by the controlled electronic device, or may be executed by other devices connected to the electronic device. The type of the audio collection device is not limited in the present disclosure. Alternatively or additionally, the audio collection device may be a body-conducted audio collection, for example a bone-conducted audio collection device (that is, a bone-conducted audio collector). By the control method of the present disclosure, more precise control of the electronic device may be realized. The application scenario of the solution is not limited in the present disclosure, and it may be applied to any scenario where electronic devices need to be controlled based on the audio detection result in theory.

An embodiment of the present disclosure further provides an electronic device including a processor. The processor may be configured to execute the method provided in an embodiment of the present disclosure to obtain the signal detection result of an audio signal to be processed.

In some embodiments, the electronic device may further include an audio collection device configured to collect an audio signal. The audio signal to be processed may be a signal collected by the audio collection device in the electronic device.

In some embodiments, the processor may be further configured to perform corresponding operations according to the signal detection result.

An embodiment of the present disclosure further provides an electronic device, including a memory, a processor and a computer program stored in the memory. The processor may implement the method provided in any one of the embodiments of the present disclosure when executing the computer program stored in the memory.

Figure 24:
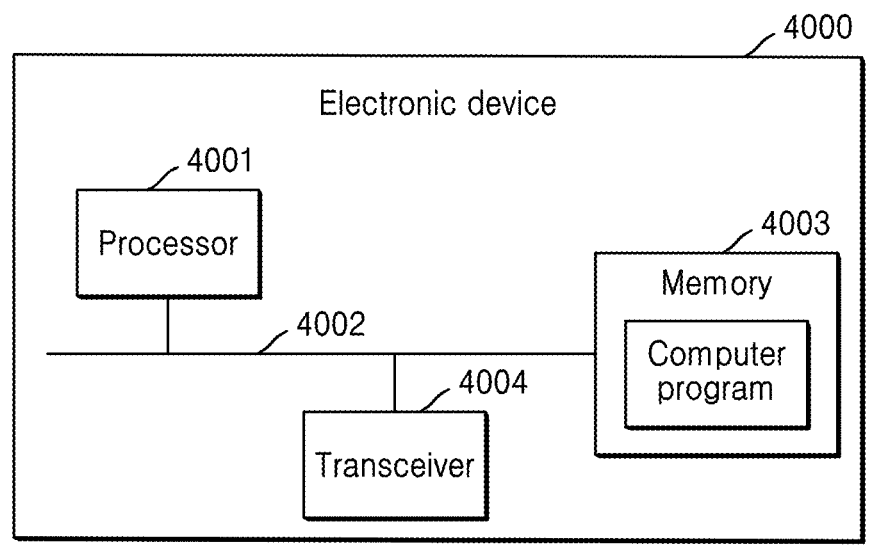
FIG. 24 is a schematic structure diagram of an electronic device, according to an embodiment.

FIG. 24 is a schematic structure diagram of an electronic device to which an embodiment of the present invention is applied. As shown in FIG. 24, the electronic device may be a server or a user terminal, and the electronic device may be used to implement the method provided in any embodiment of the present invention.

As an example, FIG. 24 shows a schematic structure diagram of an electronic device 4000 to which an embodiment of the present disclosure is applied. As shown in FIG. 24, the electronic device 4000 may include a processor 4001 and a memory 4003. The processor 4001 is connected (e.g., operatively coupled) to the memory 4003, for example, through a bus 4002. Alternatively or additionally, the electronic device 4000 may further include a transceiver 4004. It should be noted that the transceiver 4004 is not limited to one component, and the structure of the electronic device 4000 does not constitute any limitations to the embodiments of the present disclosure.

The processor 4001 may be a central processing unit (CPU), a general-purpose processor, a digital signal processor (DSP), an application specific integrated circuit (ASIC), or a field programmable gate array (FPGA), or other programmable logic devices, transistor logic devices, hardware components, or any combination thereof. It may implement or execute various exemplary logical blocks, modules and circuits described in connection with the present disclosure. The processor 4001 may also be a combination for realizing computing functions, for example, a combination of one or more microprocessors, a combination of a DSP and a microprocessor, etc.

The bus 4002 may include a path to transfer information between the components described above. The bus 4002 may be a peripheral component interconnect (PCI) bus, or an extended industry standard architecture (EISA) bus, etc. The bus 4002 may be an address bus, a data bus, a control bus, etc. For ease of presentation, the bus is represented by only one thick line in FIG. 24. However, it does not mean that there is only one bus or one type of buses.

The memory 4003 may be, but not limited to, read only memories (ROMs) or other types of static storage devices that may store static information and instructions, random access memories (RAMs) or other types of dynamic storage devices that may store information and instructions, may be electrically erasable programmable read only memories (EEPROMs), compact disc read only memories (CD-ROMs) or other optical disk storages, optical disc storages (including compact discs, laser discs, discs, digital versatile discs, blue-ray discs, etc.), magnetic storage media or other magnetic storage devices, or any other media that may carry or store desired program codes in the form of instructions or data structures and that may be accessed by computers.

The memory 4003 is used to store application program codes for executing the solutions of the present disclosure, and is controlled by the processor 4001. The processor 4001 is used to execute the application program codes stored in the memory 4003 to implement the solution provided in any method embodiment described above.

An embodiment of the present disclosure further provides a computer-readable storage medium having computer instructions stored thereon that, when executed by a processor, implement the method provided in any embodiment of the present disclosure.

The above methods performed by the electronic device in the embodiments provided by the present disclosure may be performed using an artificial intelligence (AI) model (e.g., a learning algorithm).

According to an embodiment of the present disclosure, by the method executed by the electronic device, the signal features of the audio signal may be obtained by using the audio signal as the input data to the AI model, and the detection result of the audio signal may be obtained based on the AI model, for example the classification result. The AI model may be processed by an AI-specific processor designed in a hardware architecture specified for AI model processing. The AI model may be obtained through training. Here, "obtained through training" means that the basic AI model is trained with multiple training data by a training algorithm to obtain predefined operational rules or AI models configured to perform the desired feature (or purpose). The AI model may include multiple neural network layers. Each layer of the plurality of neural network layers includes a plurality of weight values and performs a neural network computation by computing between the results of the previous layer and the plurality of weight values.

The embodiment provided by the present disclosure may implement at least one module among the plurality of modules in hardware, software, through an AI model, or any combination thereof. The functions associated with AI may be performed through a non-volatile memory, a volatile memory, and a processor. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer.

The processor may include one or more processors. In this case, the one or more processors may be a general purpose processor, (e.g., a central processing unit (CPU), an application processor (AP), etc.), or a pure graphics processing unit, (e.g., a graphics processing unit (GPU), a visual processing unit (VPU), and/or an AI-specific processor, (e.g., a neural processing unit (NPU))).

The one or more processors control processing of the input data according to predefined operating rules or AI models stored in the non-volatile memory and the volatile memory. The predefined operation rules or AI models are provided by training or learning.

Here, "providing through learning" refers to obtain a predefined operation rule or an AI model having desired features by applying a learning algorithm to multiple learning data. The learning may be performed in the apparatus itself in which the AI according to the embodiment is executed, and/or may be implemented by a separate server/system.

The AI model may include a layer including a plurality of neural networks. Each layer has a plurality of weight values, and the computation of a layer is performed by the results of the computation of the previous layer and the plurality of weights of the current layer. Examples of neural networks include, but are not limited to, convolutional neural networks (CNN), deep neural networks (DNN), recurrent neural networks (RNN), restricted Boltzmann machines (RBM), deep belief networks (DBN), bidirectional recurrent deep neural networks (BRDNN), generative adversarial networks (GAN), and deep Q networks.

A learning algorithm is a method of training a preset target device (e.g., a robot) using multiple learning data to enable, allow, or control the target device to make determinations or predictions. Examples of such learning algorithms include, but are not limited to, supervised learning, unsupervised learning, semi-supervised learning, or reinforcement learning.

The terms "first", "second", "third", "fourth", "1", "2", etc. (if any) in the specification and claims of the present invention and the accompanying drawings are used for distinguishing similar objects, rather than describing a particular order or precedence. It should be understood that the used data may be interchanged if appropriate, so that the embodiments of the present invention described herein may be implemented in an order other than the orders illustrated or described with text.

It should be understood that, although the operation steps are indicated by arrows in the flowcharts of the embodiments of the present invention, the implementation order of these steps is not limited to the order indicated by the arrows. Unless otherwise explicitly stated herein, in some implementation scenarios of the embodiments of the present invention, the implementation steps in the flowcharts may be executed in other orders as required. In addition, some or all of the steps in each flowchart may include multiple sub-steps or multiple stages based on actual implementation scenarios. Some or all of these sub-steps or phases may be executed at the same moment, and each of these sub-steps or phases may also be executed separately at different moments. The order of execution of these sub-steps or stages may be flexibly configured according to requirements in different scenarios of execution time, and the embodiments of the present disclosure are not limited thereto.

The above-mentioned description is merely an alternative embodiment for some implementation scenarios of the present disclosure, and it should be noted that it would have been within the scope of protection of embodiments of the present disclosure for those skilled in the art to adopt other similar implementation means based on the technical idea of the present disclosure without departing from the technical concept of the solution of the present disclosure.

What is claimed is:

1. A method of audio signal processing executed by an electronic device, comprising:
    obtaining guidance features corresponding to an audio signal to be processed, the guidance features indicating distinguishable features of at least one signal type of at least one signal category;
    extracting, according to the guidance features, target audio features corresponding to the audio signal;
    determining, according to the target audio features, a target signal type of the audio signal from among the at least one signal type of the at least one signal category and a target signal subtype of the target signal type from a plurality of signal subtypes of the target signal type; and
    performing corresponding processing according to the target signal type of the audio signal, the corresponding processing comprising at least one of controlling operation of the electronic device or generating, and displaying to a user of the electronic device, a state report according to a detected state of the electronic device,
    wherein the determining of the target signal type comprises, based on determining a first signal type from among the at least one signal type as the target signal type, performing signal processing on the audio signal to generate a processed audio signal, determining a second signal type of the processed audio signal, and determining the target signal type based on the first signal type and the second signal type.

2. The method according to claim 1, further comprising:
    determining, according to the guidance features, a category detection result of the audio signal, the category detection result indicating at least one probability of the audio signal matching a corresponding signal type of the at least one signal type of a corresponding signal category of the at least one signal category, wherein a first signal category of the at least one signal category has at least one first signal type, and wherein a second signal category of the at least one signal category has a plurality of second signal types; and
    based on the category detection result indicating that the audio signal matches the first signal category, determining the at least one first signal type of the first signal category as the target signal type of the audio signal,
    wherein the extracting of the target audio features corresponding to the audio signal comprises, based on the category detection result indicating that the audio signal does not match the first signal category, extracting the target audio features corresponding to the audio signal according to the guidance features.

3. The method according to claim 2, wherein the extracting of the target audio features corresponding to the audio signal comprises:
    extracting the target audio features corresponding to the audio signal according to the guidance features and the category detection result.

4. The method according to claim 2, further comprising:
    determining, according to the category detection result, a target classifier from a plurality of classifiers corresponding to the plurality of second signal types of the second signal category,
    wherein the determining of the target signal type of the audio signal comprises determining, based on the target classifier, the target signal type of the audio signal according to the target audio features.

5. The method according to claim 1, wherein the obtaining of the guidance features corresponding to the audio signal comprises:
    extracting, by a first encoder, the guidance features corresponding to the audio signal,
    wherein the extracting of the target audio features corresponding to the audio signal comprises extracting, by a second encoder, the target audio features corresponding to the audio signal according to the guidance features.

6. The method according to claim 1, wherein the extracting of the target audio features corresponding to the audio signal comprises:
    extracting initial audio features corresponding to the audio signal, the initial audio features comprising a feature map corresponding to at least one channel;
    determining, based on the guidance features, weight information corresponding to the initial audio features, the weight information comprising at least one of a first weight and a second weight, wherein the first weight is a channel weight, and wherein the second weight is spatial weight; and
    obtaining, based on the weight information, the target audio features by correcting the initial audio features using the at least one of the first weight and the second weight.

7. The method according to claim 6, wherein the extracting of the initial audio features corresponding to the audio signal comprises:
   extracting, by a plurality of feature extraction networks, corresponding audio features of the audio signal corresponding to the plurality of feature extraction networks, wherein the plurality of feature extraction networks have distinct convolution kernel sizes; and
   fusing the corresponding audio features corresponding to the plurality of feature extraction networks to obtain the initial audio features.

8. The method according to claim 1, wherein the extracting of the target audio features corresponding to the audio signal comprises:
   extracting initial audio features corresponding to the audio signal; and
   obtaining, by an attention network, the target audio features based on the guidance features and the initial audio features,
   wherein the attention network comprises at least one of a channel attention network and a spatial attention network.

9. The method according to claim 1, further comprising:
   performing signal processing on the audio signal to obtain a processed audio signal, wherein the performing of the signal processing comprises performing at least one of signal spreading, signal enhancement, and filtering a DC bias from the audio signal,
   wherein the obtaining of the guidance features corresponding to the audio signal to be processed comprises obtaining the guidance features based on at least one of the processed audio signal and processed audio features extracted from the processed audio signal based on the guidance features.

10. The method according to claim 1, further comprising:
    obtaining the audio signal to be processed that has been collected by an audio collection device;
    determining a signal detection result of the audio signal to be processed based on the audio signal to be processed, wherein the audio signal to be processed comprises at least one audio frame, wherein the signal detection result comprises the target signal type of each of the at least one audio frame.

11. The method according to claim 10, wherein the performing corresponding processing according to the target signal type of the audio signal comprises at least one of:
    determining a user state based on the signal detection result;
    determining a current environment of the user according to the signal detection result; and
    controlling an external electronic device based on the signal detection result.

12. A non-transitory computer-readable storage medium storing a computer program for audio signal processing that, when executed by a processor of an electronic device, causes the processor to execute the method according to claim 1.

13. An electronic device, comprising:
    a memory storing computer-executable instructions for audio signal processing; and
    a processor communicatively coupled to the memory, wherein the computer-executable instructions stored in the memory are configured, when executed by the processor, to cause the processor to:
    obtain guidance features corresponding to an audio signal to be processed, the guidance features indicating distinguishable features of at least one signal type of at least one signal category;
    extract, according to the guidance features, target audio features corresponding to the audio signal;
    determine, according to the target audio features, a target signal type of the audio signal from among the at least one signal type of the at least one signal category and a target signal subtype of the target signal type from a plurality of signal subtypes of the target signal type; and
    perform corresponding processing according to the target signal type of the audio signal, the corresponding processing comprising at least one of controlling operation of the electronic device or generating, and displaying to a user of the electronic device, a state report according to a detected state of the electronic device,
    wherein the determining of the target signal type comprises, based on determining a first signal type from among the at least one signal type as the target signal type, performing signal processing on the audio signal to generate a processed audio signal, determining a second signal type of the processed audio signal, and determining the target signal type based on the first signal type and the second signal type.

14. The electronic device according to claim 13, the computer-executable instructions stored in the memory are configured, when executed by the processor, to cause the processor to:
    determine, according to the guidance features, a category detection result of the audio signal, the category detection result indicating at least one probability of the audio signal matching a corresponding signal type of the at least one signal type of a corresponding signal category of the at least one signal category, wherein a first signal category of the at least one signal category has at least one first signal type, and wherein a second signal category of the at least one signal category has a plurality of second signal types; and
    based on the category detection result indicating that the audio signal matches the first signal category, determine the at least one first signal type of the first signal category as the target signal type of the audio signal,
    wherein the extracting of the target audio features corresponding to the audio signal comprises, based on the category detection result indicating that the audio signal does not match the first signal category, extracting the target audio features corresponding to the audio signal according to the guidance features.

15. The electronic device according to claim 14, wherein the extracting of the target audio features corresponding to the audio signal comprises:
    extracting the target audio features corresponding to the audio signal according to the guidance features and the category detection result.

16. The electronic device according to claim 14, the computer-executable instructions stored in the memory are configured, when executed by the processor, to cause the processor to:
    determine, according to the category detection result, a target classifier from a plurality of classifiers corresponding to the plurality of second signal types of the second signal category,
    wherein the determining of the target signal type of the audio signal comprises determining, based on the target classifier, the target signal type of the audio signal according to the target audio features.

17. The electronic device according to claim 13, wherein the obtaining of the guidance features corresponding to the audio signal comprises:

extracting, by a first encoder, the guidance features corresponding to the audio signal,
wherein the extracting of the target audio features corresponding to the audio signal comprises extracting, by a second encoder, the target audio features corresponding to the audio signal according to the guidance features.

18. The electronic device according to claim 13, wherein the extracting of the target audio features corresponding to the audio signal comprises:
   extracting initial audio features corresponding to the audio signal, the initial audio features comprising a feature map corresponding to at least one channel;
   determining, based on the guidance features, weight information corresponding to the initial audio features, the weight information comprising at least one of a first weight and a second weight, wherein the first weight is a channel weight, and wherein the second weight is spatial weight; and
   obtaining, based on the weight information, the target audio features by correcting the initial audio features using the at least one of the first weight and the second weight.

19. The electronic device according to claim 18, wherein the extracting of the initial audio features corresponding to the audio signal comprises:
   extracting, by a plurality of feature extraction networks, corresponding audio features of the audio signal corresponding to the plurality of feature extraction networks, wherein the plurality of feature extraction networks have distinct convolution kernel sizes; and
   fusing the corresponding audio features corresponding to the plurality of feature extraction networks to obtain the initial audio features.

20. The electronic device according to claim 13, wherein the extracting of the target audio features corresponding to the audio signal comprises:
   extracting initial audio features corresponding to the audio signal; and
   obtaining, by an attention network, the target audio features based on the guidance features and the initial audio features,
   wherein the attention network comprises at least one of a channel attention network and a spatial attention network.

* * * * *